(12) United States Patent
Li et al.

(10) Patent No.: US 8,520,524 B2
(45) Date of Patent: *Aug. 27, 2013

(54) METHODS AND APPARATUS FOR MAKING TRANSMITTER AND/OR RECEIVER COMMUNICATIONS DECISIONS

(75) Inventors: Junyi Li, Chester, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 12/267,905

(22) Filed: Nov. 10, 2008

(65) Prior Publication Data

US 2010/0118701 A1    May 13, 2010

(51) Int. Cl.
*H04L 12/26*    (2006.01)

(52) U.S. Cl.
USPC ............................. 370/236; 370/252; 370/445

(58) Field of Classification Search
None
See application file for complete search history.

(56) References Cited

U.S. PATENT DOCUMENTS

| | | | |
|---|---|---|---|
| 7,269,152 B2 | 9/2007 | Vukovic et al. | |
| 7,415,241 B2 | 8/2008 | Oprescu-Surcobe et al. | |
| 7,729,321 B2 * | 6/2010 | Liu | 370/337 |
| 2005/0088993 A1 * | 4/2005 | Jung et al. | 370/331 |
| 2005/0259617 A1 | 11/2005 | Wason et al. | |
| 2007/0105576 A1 | 5/2007 | Gupta et al. | |
| 2007/0133546 A1 * | 6/2007 | Kim et al. | 370/392 |
| 2007/0211680 A1 | 9/2007 | Laroia et al. | |
| 2008/0062880 A1 * | 3/2008 | Yew et al. | 370/235 |
| 2008/0069033 A1 | 3/2008 | Li et al. | |
| 2008/0170539 A1 | 7/2008 | Hyon et al. | |
| 2008/0186913 A1 * | 8/2008 | Ahn et al. | 370/329 |
| 2008/0192752 A1 * | 8/2008 | Hyslop et al. | 370/395.21 |
| 2009/0036151 A1 * | 2/2009 | Kanda | 455/501 |
| 2009/0092083 A1 | 4/2009 | Shagdar et al. | |

(Continued)

FOREIGN PATENT DOCUMENTS

| | | |
|---|---|---|
| EP | 1223771 | 7/2002 |
| JP | 2005323375 A | 11/2005 |

(Continued)

OTHER PUBLICATIONS

International Search Report—PCT/US2009/062886—International Search Authority, European Patent Office, Jun. 17, 2010.

(Continued)

*Primary Examiner* — Rhonda Murphy
(74) *Attorney, Agent, or Firm* — Joseph B. Agusta

(57) ABSTRACT

Methods and apparatus for making communications decisions are described. In some embodiments, a method includes recovering a quality of service level from a transmission request response signal and making a decision whether or not to transmit traffic data based on the recovered quality of service level. In other embodiments a method includes recovering a first quality of service level from a first transmission request response signal which is in response to a first traffic transmission request signal, and making a decision, based on the recovered first quality of service level, whether or not to transmit a second transmission request response signal in response to a second traffic transmission request signal. In some embodiments, the phase of the transmission request response signal is used to communicate the quality of service level. The device transmitting the transmission request response may also transmit pilots which can be used as phase reference signals.

36 Claims, 15 Drawing Sheets

(56) References Cited

U.S. PATENT DOCUMENTS

2009/0147734 A1* 6/2009 Naka et al. .................... 370/329
2009/0257351 A1* 10/2009 Hande et al. .................. 370/236
2010/0120445 A1 5/2010 Li et al.

FOREIGN PATENT DOCUMENTS

| JP | 2007129423 A | 5/2007 |
|----|--------------|--------|
| JP | 2008187300 A | 8/2008 |
| KR | 20050038736 A | 4/2005 |
| WO | WO 2007082247 | 7/2007 |
| WO | WO 2008034023 | 3/2008 |

OTHER PUBLICATIONS

Written Opinion—PCT/US2009/062886—ISA/EPO—Jun. 17, 2010.
Taiwan Search Report—TW098137631—TIPO—Feb. 19, 2013.

* cited by examiner

METHODS AND APPARATUS FOR MAKING TRANSMITTER AND/OR RECEIVER COMMUNICATIONS DECISIONS

FIELD

Various embodiments relate to wireless communications methods and apparatus and, more particularly, to wireless communications methods and apparatus for communicating and/or using quality of service level information.

BACKGROUND

In communications systems, data may have different levels of transmission priority due to, e.g., the type of data to be transmitted, a priority level associated with the device from which the data is to be transmitted, a priority level associated with a user of the communications device seeking to transmit data and/or a priority level associated with the intended data recipient and/or device which is to receive the data.

While the reason data may be entitled to a particular priority level may vary, for purposes of providing a comparable data priority level, the priority of the data to be transmitted may be expressed in terms of a quality of service level to which the data to be transmitted is entitled to receive in the system. The quality of service level may be expressed as a one or multi-bit value depending on the system and/or the number of bits available for communicating quality of service level information.

To facilitate implementation of different levels of quality of service, it is useful for one or more devices in a communications system to know the quality of service level corresponding to the data to be communicated.

In peer to peer communications systems, where individual peer devices may make decisions on whether to proceed with data transmission or to respond to requests to transmit data, it would be useful if individual peer devices making the decisions had quality of service information available when making transmission related decisions.

Thus, it should be appreciated that there is a need for methods of facilitating communications between peer devices which would allow for the communication and/or use of quality of service level information.

SUMMARY

Methods and apparatus for use in wireless communications networks, e.g., regional ad hoc peer to peer networks, are described.

Some but not necessarily all aspects are directed to methods and/or apparatus for making transmitter yielding and/or receiver yielding decisions. In the case of transmitter yielding decisions, a device, e.g., peer to peer device, desiring to transmit may make a decision to refrain from transmitting, e.g., due to interference and/or quality of service issues. In the case of receiver yielding, a device may decide not to transmit a transmission request response and thus forgo the opportunity for a transmission to the device deciding not to transmit the transmission request response. Quality of service issues may include priority issues, e.g., with a device deciding to refrain from transmitting data or a transmission request response because, for example, the data it has to transmit is entitled to a lower quality of service level than data corresponding to another connection.

An exemplary method of operating a first communications device, in accordance with one exemplary embodiment comprises recovering a quality of service level from a first transmission request response signal and making a decision whether or not to transmit traffic data based on the recovered quality of service level. In some, but not necessarily all embodiments, the quality of service level is recovered from the phase of the first transmission request response signal. A pilot received from the first communications device may, and in some embodiments is, used to interpret phase of the first transmission request response.

An exemplary first communications device, in accordance with some embodiments, comprises at least one processor configured to recover a quality of service level from a first transmission request response signal and make a decision whether or not to transmit traffic data based on the recovered quality of service level. The first device may also include a memory coupled to the at least one processor.

Another exemplary method of operating a first communications device, in accordance with another exemplary embodiment comprises recovering a first quality of service level from a first transmission request response signal which is in response to a first traffic transmission request signal and making a decision, based on the recovered first quality of service level, whether or not to transmit a second transmission request response signal in response to a second traffic transmission request signal.

An exemplary first communications device implemented in accordance with another aspect includes at least one processor configured to recover a first quality of service level from a first transmission request response signal which is in response to a first traffic transmission request signal and to make a decision, based on the recovered first quality of service level, whether or not to transmit a second transmission request response signal in response to a second traffic transmission request signal. A memory may, and in some embodiments is, coupled to the at least one processor.

The methods and apparatus described herein are particularly well suited for use in a system with an access router, e.g., that transmits pilot signals, that can be used as a phase reference allowing for accurate interpretation of the phase of other signals, e.g., request response signals, transmitted by the access router.

In accordance with some aspects, the phase of a transmission request response signal sent by the access router communicates priority level information. A device receiving the access router transmission request response, e.g., a response to an uplink transmission request made by a peer to peer communications device which requested permission to transmit to the access router, can detect the access router transmission request response and determine the corresponding quality of service level from the received signal. The quality of service level corresponding to the data to be transmitted to the access router can, and in some embodiments is, recovered from the request response signal, e.g., by interpreting the phase of the request response signal based on a pilot signal received from the access router. In one such embodiment, the phase of the request response signal communicates quality of service level information while the energy of the request response signal is used to communicate an affirmative response to the transmission request. The device receiving the access router transmission request response can, and in some embodiments does, make a decision whether or not to proceed with transmitting to another device based on the quality of service level information recovered from the access router transmission request response. For example, if the device has data with a higher priority level than that indicated by the access router transmission request response the device may proceed with its intended transmission regardless of whether or not it will interfere with the transmission to the access router expected to occur following the access router transmission request response. However, if the data the device intends to transmit has a lower priority level than the priority level indicated by the access router transmission request response, the device may make a decision whether or not to transmit based on the amount of interference transmitting may cause to the transmission to the access router. The amount of interference may be expressed in terms of a cost function or interference cost estimate, where a higher cost indicates a higher interference impact on the transmission to the access router. If the interference cost is above a predetermined threshold and the priority level of the data to be transmitted is lower than the priority level indicated in the access router transmission request response, the device may, and in some embodiments does, decide to forgo transmitting to avoid causing interference to the expected transmission to the access router.

In accordance with another aspect, a device receiving a transmission request response from an access router that is in response to a transmission request sent by another device to the access router, decides whether or not to transmit a transmission request response to a transmission request that was sent by a different device to said device. This receiver yielding decision in some embodiments, is made based on a quality of service level recovered from the access router transmission request response. In some but not necessarily all embodiments, the quality of service level information is recovered from the phase of the access router transmission request response. The use of one or more pilots from the access router allows the phase of the access router transmission request response signal to be interpreted accurately and thus allows for the quality of service level to be communicated using the phase of the transmission request response signal.

While some aspects of the invention are well suited for use in applications where an access router is the device transmitting the request response it should be appreciated that the methods and embodiments described herein are not limited to embodiments where the access router is the device transmitting the request response. Furthermore, it should be appreciated that while phase is used in some embodiments to communicate quality of service level information, it is possible to code quality of service, e.g., priority, information in a variety of ways.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
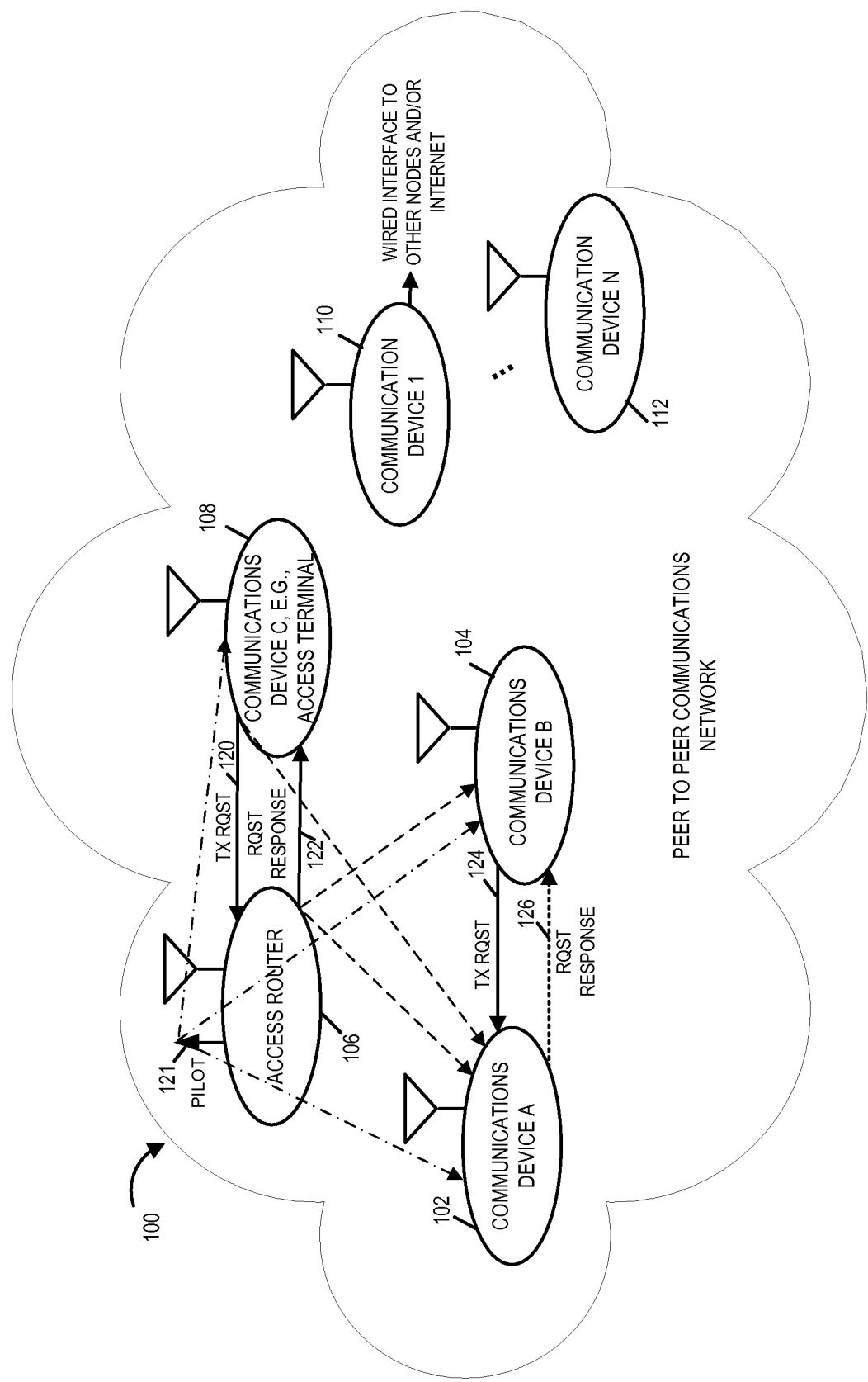
FIG. 1 is a drawing of an exemplary peer to peer communications network, e.g., an ad-hoc peer to peer communications network in a local region, in accordance with one exemplary embodiment.

FIG. 1 is a drawing of an exemplary peer to peer communications network 100, e.g., an ad-hoc peer to peer communications network implemented in a local region, in accordance with one exemplary embodiment. Exemplary communications network 100 includes a plurality of peer to peer wireless communications devices (communications device A 102, communications device B 104, communications device C 108, communications device 1 110, . . . , communications device N 112) and an access router 106, e.g., a base station. Although one access router has been shown in the communications network 100, it should be appreciated that the communications network may, and sometimes does include several access routers. The wireless communications devices (102, 104, 108, 110, . . . , 112) support various signaling between peers, e.g., peer discovery signals, transmission request signals, transmission request response signals, etc., and data transmissions, e.g., traffic signals, between peers. Some of the peer to peer communications devices, e.g., communications device 1 110, also include a wired interface, which couples the peer to peer communications device to other nodes and/or the Internet, in addition to a wireless communications interface. Some of the peer to peer communications devices are mobile communications devices, e.g., handheld mobile communications devices.

In accordance with one exemplary embodiment, a peer to peer communications device, e.g., the communications device C 108, sends a transmission request signal 120 to the access router 106. The access router 106 may, and sometimes does, respond to the communications device C 108 by sending a request response signal 122. In some embodiments the transmission of request response signal 122 signifies that access router 106 acquiesces to the transmission request of signal 120. In some embodiments, the request response signal 122 is a single tone signal, i.e., a signal communicated using a single OFDM tone. In some such embodiments, such a single tone signal is communicated during a single OFDM transmission time interval, e.g., the single tone signal is communicated using one OFDM tone-symbol. In some embodiments, different sets of OFDM tone-symbols in a timing/ frequency structure are associated with different signals, e.g., request signals, request response signals, pilot signals, beacon signals, etc. In some embodiments, request response signal 122 is sometimes communicated using a single tone. In some such embodiments the phase of the request response signal 122 communicates a quality of service (QoS) level, e.g., a transmission priority. In accordance with an exemplary embodiment, the wireless communications devices (102, 104, 108, 110, ..., 112) are aware of access routers in the system 100 including access router 106. In some such embodiments, the communications devices (102, 104, 108, 110, ..., 112) track the channel to one or more of the access routers in the network 100 including the access router 106, that the communications devices (102, 104, 108, 110, ..., 112) can currently detect. For example, consider that communications device A 102 has been able to detect access router 106 and has been tracking the channel between access router 106 and itself. Further consider that communications device B 104 has been able to detect access router 106 and has been tracking the channel between access router 106 and itself device. Further consider that communications device A 102 and communications device B 104 also receive the request response signal 122 transmitted from the access router 106 to communications device C 108. Using the tracking channel conditions, communications device A 102 and communications device B 104 are able to recover information communicated in the request response signal 122, e.g. QoS level information communicated in the phase of request response signal 122.

As shown in FIG. 1, peer to peer communications device B 104 seeks to transmit data, e.g., traffic data, to peer to peer communications device A 102. Thus communications device B 104 sends a transmission request signal 124 to the communications device A 102. In some embodiments the communications device A 102 sends a request response signal 126 back to the communications device B 104, if communications device A 102 acquiesces to the transmission request of signal 124. In some embodiments, the request response signal 126 communicates to the device B 104 that communications device A 102 is agreeable to receive traffic data from device B 104. In some embodiments, communications device A 102 decide whether or not to transmit a request response signal 126 in response to the transmission request signal 124 based on whether or not one or more conditions are satisfied. For example, in one exemplary embodiment communications device A 102 recovers a QoS level from the phase of the received request response signal 122. If the QoS level indicates that higher priority traffic data is to be communicated from communications device C 108 to the access router 106, then communications device A 102 may, and sometimes does, decide not to transmit the request response signal 126. In some embodiments, the decision of whether or not to transmit the request response signal 126 is based additional criteria, in addition to a criteria based on detection of intended higher priority traffic of another connection. For example, in some embodiments, communications device A 102 decides whether or not to transmit the request response signal 126 based on the received power of the transmission request signal 124 and received power of the transmission request signal 120.

In some embodiments, in the event when the request response 126 is received by the communications device B 104, it decides whether or not to transmit traffic data to the communications device A 102 based on whether or not one or more conditions are satisfied, e.g., as discussed above. In one exemplary embodiment communications device B 104 recovers a QoS level from the phase of the received request response signal 122. In some embodiments, the communications device B 104 uses a generated channel estimate for a channel between communications device B 104 and the access router 106, to interpret the phase of the received request response signal 122, e.g., recovering the QoS level from the phase. The channel estimate may be, and sometimes is, generated by communications device B 104 using a pilot signal 121 received from the access router 106. In some embodiments communication device B 104 is aware of the transmission priority level of the traffic data that communications device B 104 wishes to communicate to communications device A 102. In some embodiments, if the recovered QoS level indicates that the traffic data to be communicated from communications device C 108 to the access router 106 has a higher priority, as indicated by the recovered QoS level, than the priority associated with its own intended traffic transmission, then communications device B 104 may, and sometimes does, decide to yield, i.e., not transmit its traffic data to communications device A 102 in the current transmission slot. In some other embodiments, the communications device B 104 may decide to transmit its traffic data to communications device A 102 based on predetermined criteria. In some embodiments, a transmitter yielding decision by communications device B 104 to yield is made to facilitate communication of the higher priority traffic data from the communications device C 108 to the access router 106. Thus the transmitter yielding of communications device B 104 allows traffic from communications device C 108 to access router 106 to occur without interference from traffic transmissions between communications device B 104 and communications device A 102 in the same traffic air link resource, e.g., same traffic segment.

Figures 2, 2A, 2B:
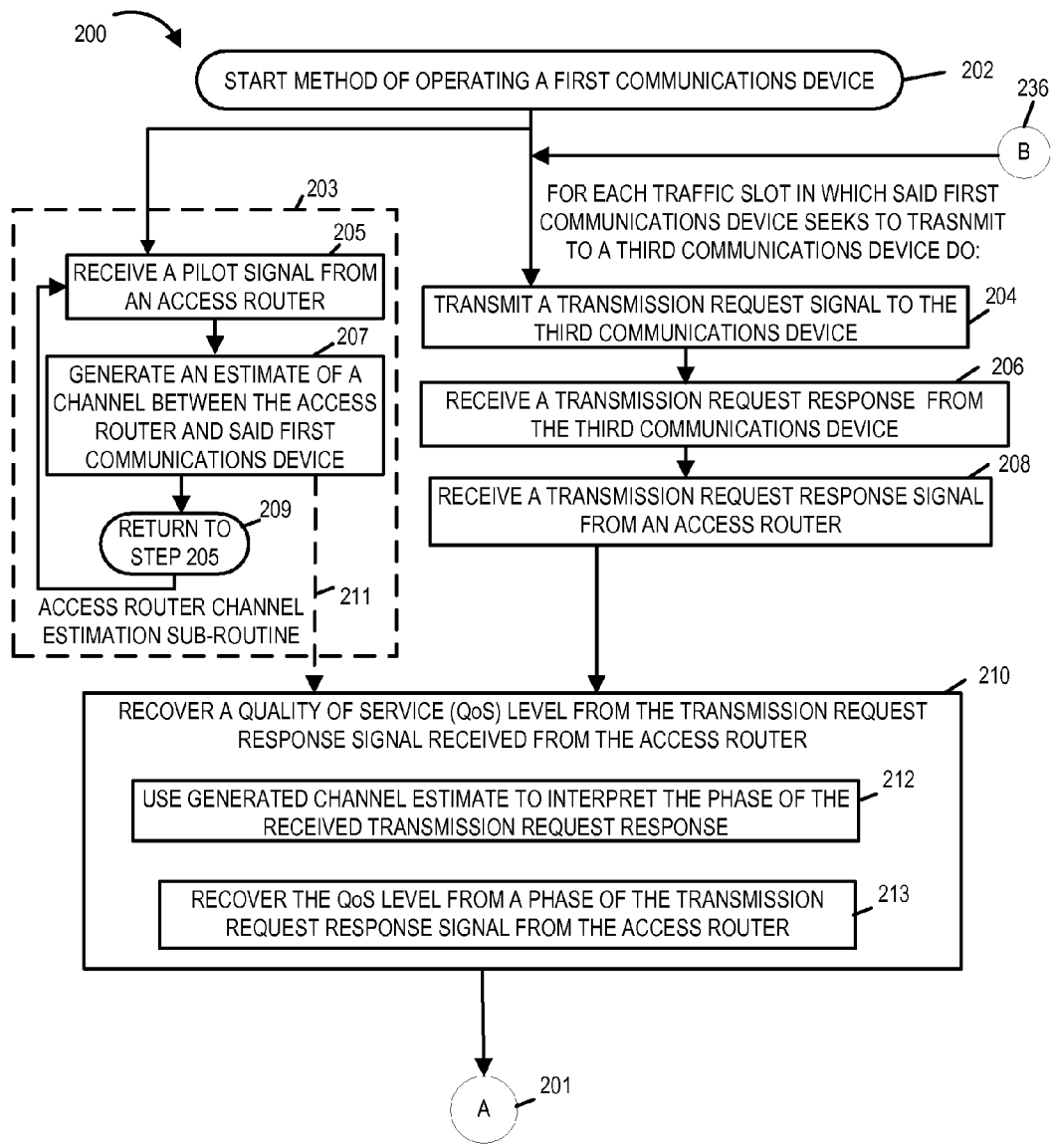
FIG. 2A is a first portion of a flowchart of an exemplary method of operating a first communications device in accordance with an exemplary embodiment.
FIG. 2B is a second portion of a flowchart of an exemplary method of operating a first communications device in accordance with an exemplary embodiment.
Figure 2B:
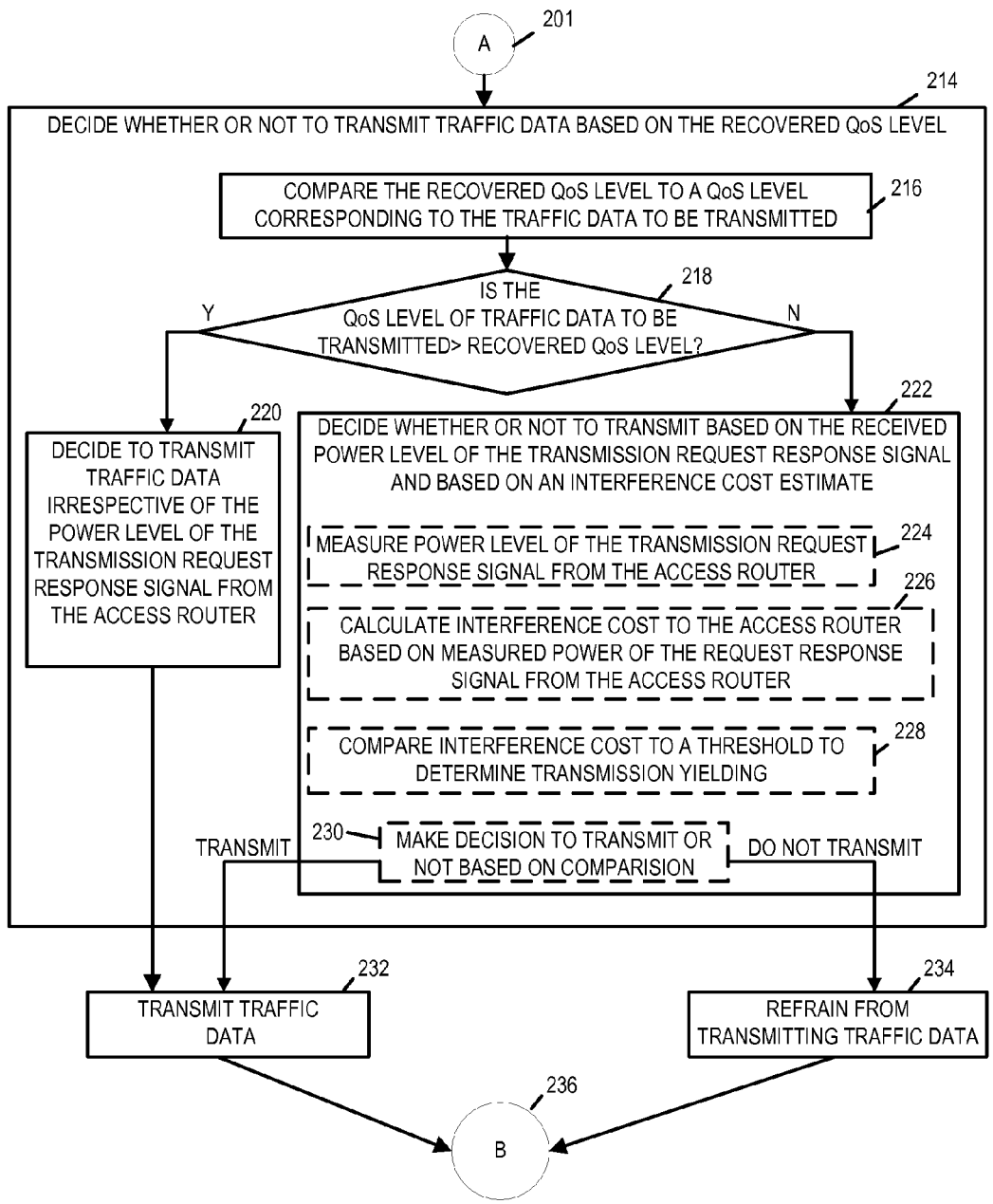

FIG. 2, which comprises the combination of FIGS. 2A and 2B, is a flowchart 200 of an exemplary method of operating a first communications device, e.g., communications device B 104 of FIG. 1, in accordance with an exemplary embodiment. Operation of the exemplary method starts in step 202 where the first communications device, e.g. device B 104, is powered on and initialized. Operation proceeds from start step 202 to step 204. In accordance with an exemplary embodiment, for each traffic slot in which the first communications, e.g., device B 104, seeks to transmit to a third communications device, e.g., device A 102, various steps of flowchart 200 are performed as discussed below. In various embodiments, the first communications, e.g., device B 104, executes a channel estimation sub-routine 203 in parallel with various other steps in flowchart 200. Channel estimation sub-routine 203 implements a channel estimation process for the channel between the first communications device, e.g., device B 104, and an access router, e.g., access router 106. The sub-routine includes steps 205, 207 and 209 which are performed at a different rate, e.g., a slower rate, than the rate at which other steps of flowchart 200 are performed. For example, the execution of sub-routine 203 may be repeated after a time period which includes multiple traffic slots in which the first communications device, e.g., device B 104, seeks to transmit traffic data to a third device, e.g., device A 102.

In step 204 the first communications device, e.g., device B 104, transmits a transmission request signal, e.g., request signal 124, to the third communications device, e.g., communications device A 102. The operation proceeds from step 204 to step 206 wherein the first communications device B 104 receives a transmission request response signal, e.g., request response signal 126, from the third communications device A 102. The transmission request response signal 126 being in response to the request signal 124 sent by the first communications device, e.g., device B 104. Operation proceeds from step 206 to step 208.

In step 208, the first communications device, e.g., device B 104 receives a transmission request response signal, e.g., request response signal 122, from an access router, e.g., access router 106. The transmission request response 122 is in response to a traffic transmission request signal, e.g., request signal 120, sent from a second communications device, e.g., communications device C 108, to the access router 106. In some embodiments, the transmission request response signal 122 is a single tone signal. In various embodiments, the phase of the transmission request response signal 122 carries QoS information. In some embodiments, the QoS information conveys a traffic transmission priority for transmission of the traffic data for which the transmission request 120 was made by second communications, e.g., device C 108. The operation proceeds from step 208 to step 210.

Sub-routine 203, which includes steps 205, 207 and 209, will now be discussed. In step 205, the first communications device, e.g., device B 104, receives a pilot signal, e.g., pilot signal 121, from the access router 106. Operation proceeds from step 205 to step 207 in which the first communications device, e.g., device B 104, generates a channel estimate of a channel between the access router 106 and the first communications device, e.g., device B 104. In accordance with an exemplary embodiment, the generated channel estimate is sometimes used by the first communications device, e.g., device B 104, to interpret phase of the transmission request response signal 122. The arrow 211 represents that generated channel estimate is available to the device B 104 and may be used in step 210. The operation proceeds from step 207 to return 209 from where the operation proceeds back to step 205. As previously discussed, the sub-routine 203 may be, and sometimes is, repeated after a certain time period, e.g., in accordance with a predetermined schedule.

Returning to step 210, in step 210, the first communications device, e.g., device B 104, recovers a QoS level from the transmission request response signal received from the access router, e.g., from transmission request response signal 122 received from access router 106. In some embodiments, the first communications device, e.g., device B 104, as part of recovering a QoS level in step 210, performs sub-steps 212 and 213. In sub-step 212, the first communications device uses the generated channel estimate, e.g., as generated in step 207, to interpret a phase of the received transmission request response signal, e.g., signal 122. For example, it is possible that without the generated channel estimate of step 207, the first communications device, e.g., device B 104, may not have a reference point in order to properly decode the phase of the received request response signal 122 corresponding to the connection between access router 106 and communications device C 108. Thus, in order to correctly decode the phase of the signal 122 and retrieve the QoS level being communicated, the first communications device, e.g. device B 104, generates a channel estimate using the pilot signal, e.g., pilot signal 121, and performs a channel compensation operation to compensate for phase distortions caused due to channel variations. This is performed so that the first communications device, e.g., device B 104, can adjust for channel conditions between itself and access router 106 and thus read the phase of the signal 122 and recover the correct QoS level being communicated the phase. In sub-step 213 the QoS level is recovered from the phase of the received transmission request response signal, e.g., signal 122. Operation proceeds from step 210 to step 214 via the connecting node 201.

In step 214 the first communications device, e.g. device B 104, decides whether or not to transmit traffic data based on the recovered QoS level. In some embodiments, step 214 includes sub-steps 216, 218, 220 and 222. In sub-step 216 the first communications device, e.g. device B 104, compares the recovered QoS level to a QoS level corresponding to the traffic data to be transmitted. The comparison is made between the recovered QoS level from the request response signal from the access router of step 210 and the QoS level associated with the traffic data which is to be transmitted from the first communications device, device B 104, to the third communications device, e.g., device A 102. In some embodiments, the QoS level comparison is simply a comparison of the transmission priority indicated by the recovered QoS level and transmission priority of the traffic data to be transmitted from first communication device, e.g., device B 104, to second communications device, e.g., device A 102. Operation proceeds from sub-step 216 to sub-step 218.

In sub-step 218, the first communications device, e.g., device B 104, makes a decision how to proceed based on the result of the comparison of the QoS levels. If the QoS level of the traffic data to be transmitted is greater than the recovered QoS level, then operation proceeds from step 218 to sub-step 220. In step 220 the first communications device, e.g., device B 104, decides to transmit its traffic data to the third communications device, e.g., device A 102, irrespective of the power level of the transmission request response signal received from the access router, e.g., irrespective of the received power level of signal 122. In such an event, the operation proceeds from step 220 to step 232.

Returning to sub-step 218, in step 218 if the QoS level of the traffic data to be transmitted is lower than the recovered QoS level, operation proceeds from sub-step 218 to sub-step 222. In sub-step 222 the first communications device, e.g., device B 104, decides whether or not to transmit based on the received power level of the transmission request response signal from the access router and based on an interference cost estimate. For example, in some embodiments an interference cost estimate, e.g., an SIR level, is calculated by the first communications device, e.g., device B 104, as a part of the decision making sub-step 222 which may include one or more of sub-steps 224, 226, 228 and 230. In sub-step 224 power level of the received transmission request response signal from the access router, e.g. signal 122, is measured. Using the measured power level of the request response signal from step 224, the interference cost to the access router 106 is calculated in sub-step 226. The calculated interference cost provides an indication of the amount of interference that may be caused by the first communications device, e.g. device B 104, to the access router, e.g., access router 106, if the first communications device, e.g., device B 104, transmits traffic data. In sub-step 228 the calculated interference cost of step 226 is compared to a threshold level in order to determine if the first communications device, e.g., device B 104, is expected to cause interference above a threshold level to the access router, e.g., access router 106. Although, we have discussed the interference cost to the access router 106 as an example here, it should be appreciated that the first communications device, e.g., device B 104, may, and sometimes does, calculate interference cost to one or more of the other communications devices in the network 100, for which there may be an intended traffic communications which may be expected to experience interference from the first communications device's intended traffic signaling, to decide if the first communications device, e.g., device B 104, may transmit its traffic data or should refrain from transmitting its traffic data in the traffic slot. For example, the first communications device, e.g., device B 104 may be controlled to refrain from transmitting traffic signals in the traffic slot if it is expected to cause an unacceptable level of interference to one or more other communications device or devices. In sub-step 230, a decision is made by the first communications device, e.g., device B 104, whether or not to transmit based on the result of the comparison of step 228.

The operation proceeds from step 222 which includes sub-steps 224, 226, 228 and 230, to either step 232 or step 234 based on the decision made in sub-step 222. If the calculated interference cost is below the threshold then, a positive decision, i.e., decision to transmit traffic data is made and the operation proceeds to step 232. In step 232, the first communications device, e.g., device B 104 transmits the traffic data to the third communications device, e.g. device A 102. Operation proceeds from step 232 to step 236. However, if the calculated interference cost is over the threshold then a decision not to transmit traffic data is made by the first communications device, e.g., device B 104. In such an event operation proceeds from step 222 to step 234 where the first communications device, e.g., device B 104, refrains from transmitting the traffic data. Operation proceeds from step 234 to connecting node 236. From connecting node 236 operation proceeds to step 204, where another transmission request signal is transmitted to the third communications device, e.g. device A 102, corresponding to a subsequent traffic slot in which the first communications device, e.g., device B 104, seeks to transmit traffic signals to the third communications device, e.g., device A 102. In some embodiments, the repeat rate of the access router channel estimation sub-routine 203 and the traffic slot structure is such that multiple iterations of steps 204 through connecting node 236 can be, and sometimes are, repeated prior to receiving another pilot signal from the access router 106. Thus, in some embodiments, the first communications device, e.g., device B 104, can, and sometimes does make multiple decisions whether or not to transmit traffic data in different transmission time slots.

Figure 3:
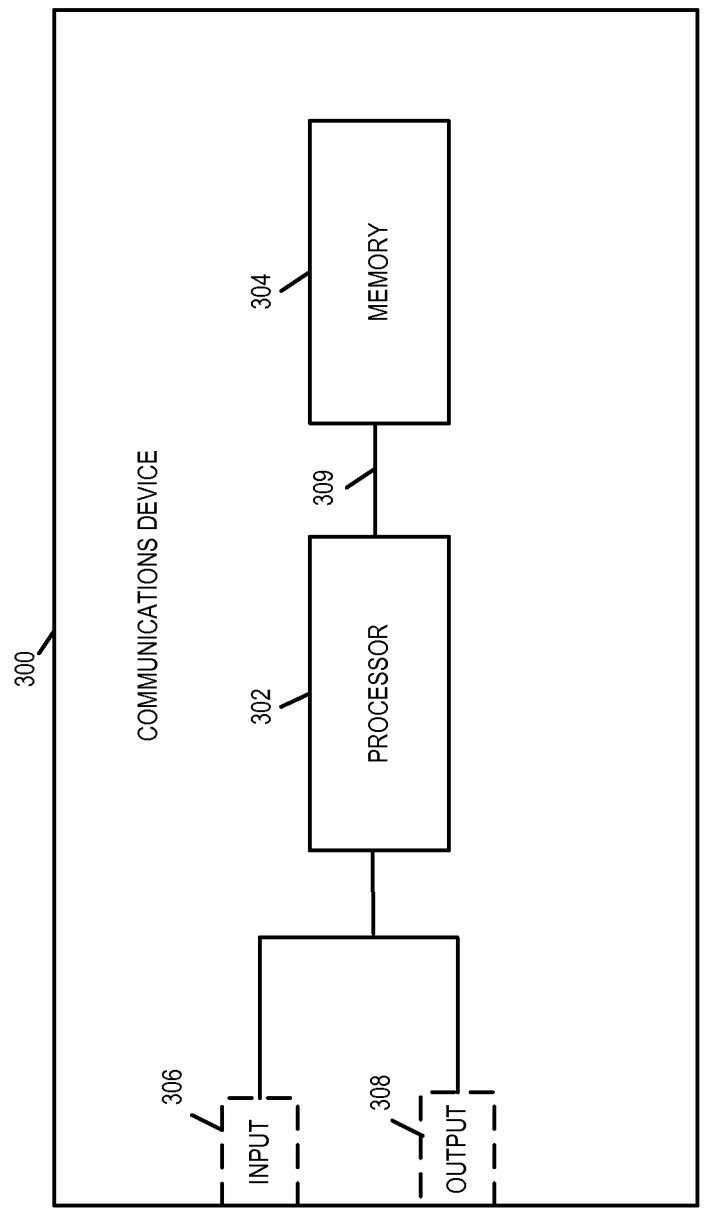
FIG. 3 is a drawing of an exemplary communications device in accordance with an exemplary embodiment.

FIG. 3 is a drawing of an exemplary communications device 300 in accordance with an exemplary embodiment. Communications device 300 is, e.g., a mobile wireless terminal supporting peer to peer communications and implementing a method in accordance with flowchart 200 of FIG. 2. Communications device 300 is, e.g., communications device B 104 of system 100 of FIG. 1, Communications device 300 includes a processor 302 and memory 304 coupled together via a bus 309 over which the various elements (302, 304) may interchange data and information.

Communications device 300 further includes an input module 306 and an output module 308 which may be coupled to the processor 302 as shown. However, in some embodiments the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. Processor 302 is configured to: recover a quality of service level from a transmission request response signal, and make a decision whether or not to transmit traffic data based on the recovered quality of service level. The processor 302 is further configured to: receive the transmission request response signal from an access router, and recover the quality of service level from a phase of the transmission request response signal. The transmission request response signal is in response to a traffic transmission request sent from a second communications device to the access router. In some embodiments, the processor 302 is further configured to: receive a pilot signal from the access router, generate an estimate of a channel between said access router and said communications device 300, and use the generated channel estimate to interpret the phase of the received transmission request response signal.

In some embodiments the processor 302 is further configured to compare the recovered QoS level to a QoS level corresponding to said traffic data. In some embodiments the processor 302 is further configured to decide to transmit irrespective of the received power level of transmission request response when the QoS level of the traffic data to be transmitted is higher than the recovered QoS level. In at least one embodiment, the processor 302 is further configured to decide whether or not to transmit based on the received power level of transmission request response signal and based on an interference cost estimate, when the QoS level of the traffic data to be transmitted is lower than the recovered QoS level. In at least some embodiments, the processor 302 is further configured to control the communications device 300 to make multiple decisions whether or not to transmit traffic data in different transmission time slots. The processor 302 may make multiple decisions, for example, prior to receiving another pilot signal from the access router.

Figure 4:
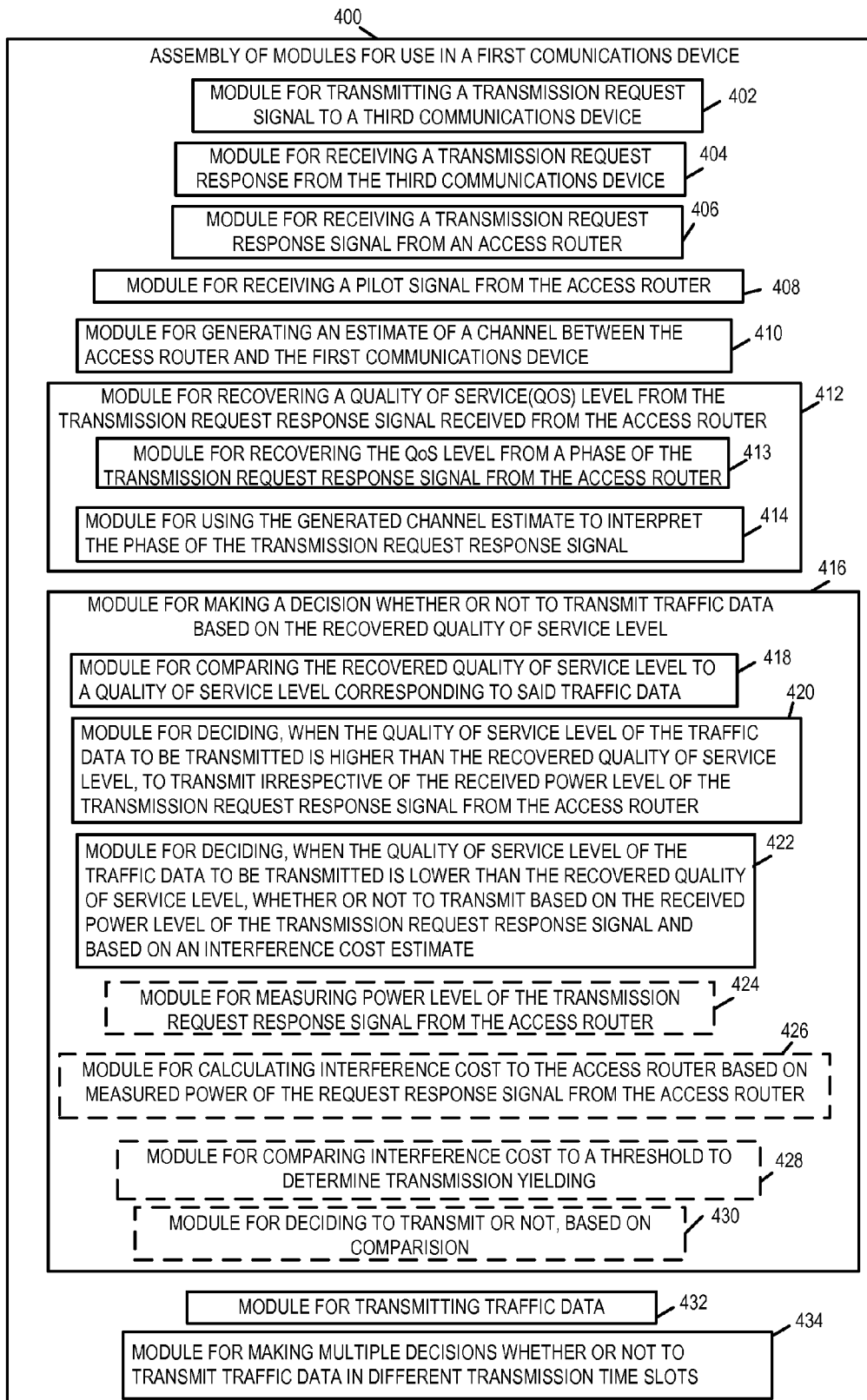
FIG. 4 illustrates an assembly of modules which can be used in the exemplary communications device of FIG. 3.

FIG. 4 is an assembly of modules 400 which can, and in some embodiments are, used in the communications device illustrated in FIG. 3. The modules in the assembly 400 can be implemented in hardware within the processor 302 of FIG. 3, e.g., as individual circuits. Alternatively, the modules may be implemented in software and stored in the memory 304 of the communications device shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

As illustrated in FIG. 4, the assembly of modules 400 includes a module 402 for transmitting a transmission request signal to a third communications device, a module 404 for receiving transmission request response from the third communications device, a module 406 for receiving a transmission request response signal from an access router, a module 408 for receiving a pilot signal from the access router, a module 410 for generating an estimate of a channel between said access router and said first communications device, and a module 412 for recovering a quality of service (QoS) level from the transmission request response signal received from the access router, and a module 416 for making a decision whether or not to transmit traffic data based on the recovered quality of service level. In some embodiments the module 412 also includes a module 413 for recovering the QoS level from a phase of the transmission request response signal from the access router and a module 414 for using the generated channel estimate to interpret the phase of the received transmission request response signal.

In at least one embodiment the module 416 includes: a module 418 for comparing the recovered quality of service level to a quality of service level corresponding to said traffic data, a module 420 for deciding, when the quality of service level of the traffic data to be transmitted is higher than the recovered quality of service level, to transmit irrespective of the received power level of the transmission request response signal from the access router, and a module 422 for deciding, when the quality of service level of the traffic data to be transmitted is lower than the recovered quality of service level, whether or not to transmit based on the received power level of the transmission request response signal from the access router and based on an interference cost estimate. The module 416 may also include one or more of: a module 424 for measuring power level of the transmission request response from the access router, a module 426 for calculating interference cost to the access router based on measured power of the request response from the access router, a module 428 for comparing the interference cost to a threshold to determine transmission yielding, and a module 430 for deciding to transmit or not based on the comparison made by module 428.

The assembly of modules 400 further includes a module 432 for transmitting traffic data, and a module 434 for making multiple decisions whether or not to transmit traffic data in different transmission time slots, for example, prior to receiving another pilot signal from the access router.

Figure 5:
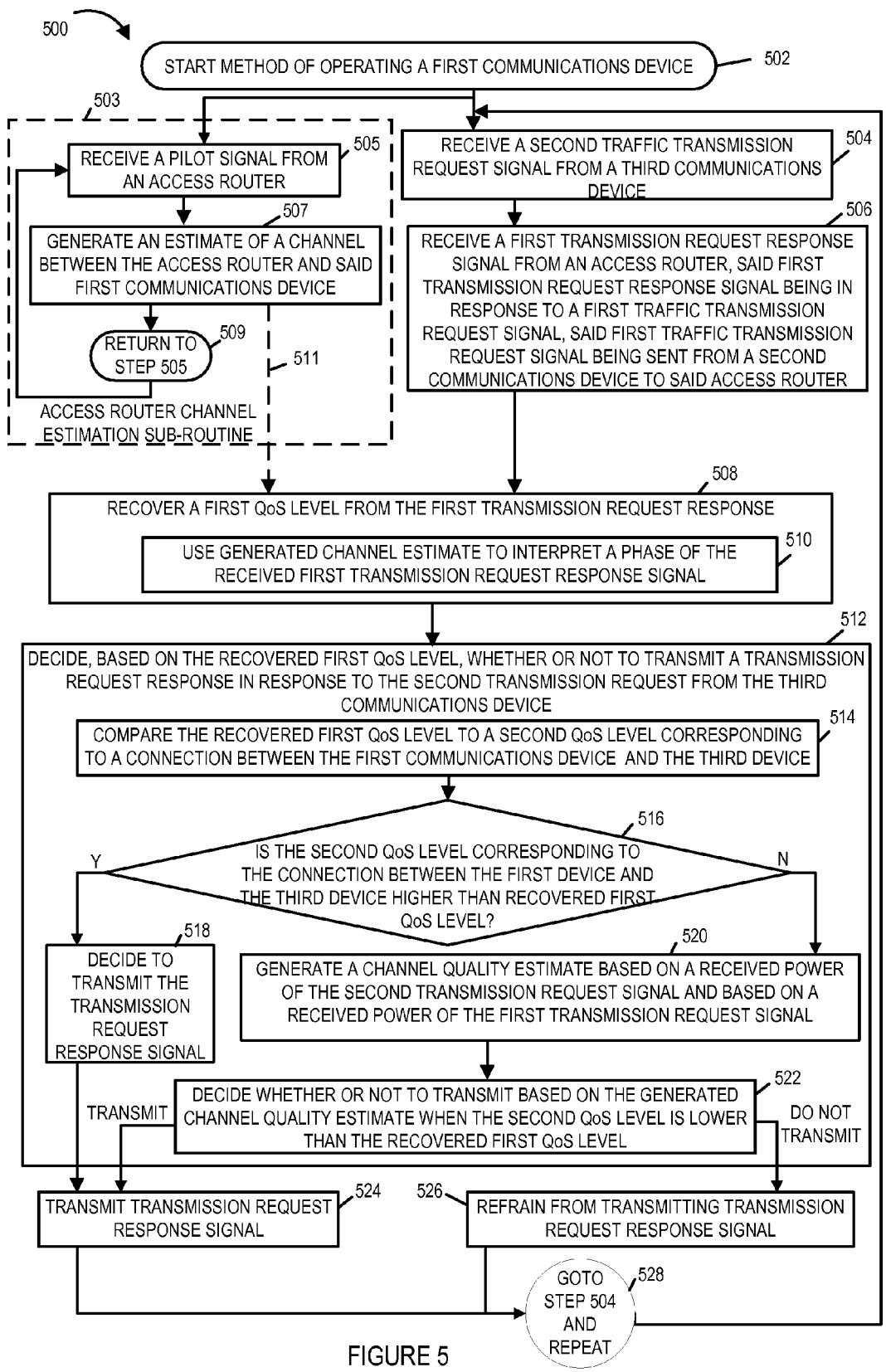
FIG. 5 is a flowchart of an exemplary method of operating a first communications device in accordance with an exemplary embodiment.

FIG. 5 is a flowchart 500 of an exemplary method of operating a first communications device, e.g., communications device A 102 of FIG. 1, in accordance with an exemplary embodiment. Operation of the exemplary method starts in step 502 where the first communications device, e.g., device A 102, is powered on and initialized. Operation proceeds from start step 502 to step 504. In some embodiments, the first communications device, e.g., device A 102, also executes channel estimation sub-routine 503 in parallel with various other steps in flowchart 500.

Channel estimation sub-routine 503 implements a channel estimation process for the channel between the first communications device, e.g., device A 102, and an access router, e.g., access router 106. The sub-routine includes steps 505, 507 and 509 which are performed at a different rate, e.g., a slower rate, than the rate at which other steps of flowchart 500 are performed. For example, the execution of sub-routine 503 may be repeated after a time period which includes multiple traffic slots in which the first communications device, e.g., device A 102, may make a decision whether or not to transmit a transmission request response, e.g., to a third communications device, e.g., device B 104.

In step 504 the first communications device, e.g., device A 102, receives a second transmission request signal, e.g., transmission request signal 124, from a third communications device, e.g., communications device B 104. The operation proceeds from step 504 to step 506 wherein the first communications device, e.g., device A 102, receives a first transmission request response signal, e.g., request response signal 122, from an access router, e.g., access router 106. The first transmission request response signal, e.g., signal 122, is in response to a first traffic transmission request signal, e.g., transmission request signal 120, said first traffic transmission request signal being sent from a second communications device, e.g., communications device C 108, to the access router 106. In some embodiments, the transmission request response signal, e.g., signal 122, is a single tone signal. As discussed earlier in example of FIG. 2, in some embodiments, the phase of the transmission request response signal, e.g. the phase of signal 122 may carry QoS information. In some embodiments, the QoS information conveys a traffic transmission priority for transmission of the traffic data for which a corresponding transmission request was made, e.g., the corresponding transmission request is transmission request 120 which was made by communications device C 108. Operation proceeds from step 506 to step 508.

Sub-routine 503, which includes steps 505, 507 and 509, will now be discussed. In step 505, the first communications device, e.g., device A 102, receives a pilot signal, e.g., pilot signal 121, from the access router 106. Operation proceeds from step 505 to step 507 in which the first communications device, e.g., device A 102, generates a channel estimate of a channel between the access router 106 and the first communications device, e.g., device A 102. In accordance with an exemplary embodiment, the generated channel estimate is sometimes used by the first communications device, e.g., device A 102, to interpret phase of the transmission request response signal 122. The arrow 511 represents that generated channel estimate is available to the first communications device, e.g., device A 102 and may be used in step 510. The operation proceeds from step 507 to return 509 from where the operation proceeds back to step 505. As previously discussed, the sub-routine 503 may be, and sometimes is, repeated after a certain time period, e.g., in accordance with a predetermined schedule.

In step 508, the first communications device, e.g. device A 102, recovers a first QoS level from the first transmission request response signal, e.g., signal 122. In some embodiments the first communications device, e.g., device A 102, recovers the QoS level from a phase of the first transmission request response signal, e.g., from the phase of signal 122. In some embodiments, first communications device, e.g. device A 102, as part of recovering a QoS level in step 508, also performs sub-step 510. In sub-step 510, the first communications device, e.g. device A 102, uses the generated channel estimate, e.g., as generated in step 507, to interpret a phase of the received first transmission request response signal, e.g. the phase of signal 122. Use of a generated channel estimate to interpret the phase has been discussed in detail earlier in the example of FIG. 2 and will not be repeated again.

Operation proceeds from step 508 to step 512 wherein the first communications device, e.g. device A 102, decides based on the recovered QoS level, whether or not to transmit a transmission request response, e.g., request response 126, in response to the second traffic transmission request 124 from the third communications device, e.g., device B 104. In some embodiments, step 512 the various sub-steps 514, 516, 518, 520 and 522 are performed as a part of the decision making step 512. In sub-step 514, the first device, e.g. device A 102, compares the recovered first QoS level to a second QoS level corresponding to a connection between the first communications device, e.g., device A 102, and the third communications device, e.g., device B 104. For example, there may be a connection identifier associated with the connection between the first communications device, e.g. device A 102, and the third communications device, e.g., device B 104. In some embodiments there is a QoS level associated with such a connection identifier. In some such embodiments the QoS level is, e.g., a traffic transmission priority level for the traffic to be transmitted from the third communications device, e.g., device B 104, to the first communication device, e.g. device A 102. Thus in at least one embodiment, in step 514 the comparison is a comparison between the traffic transmission priority indicated by the recovered QoS level and transmission priority of the traffic data to be transmitted from the third communication device, e.g., device B 104, to the first communications device, e.g., device A 102. Operation proceeds from sub-step 514 to sub-step 516.

In sub-step 516, the first communications device, e.g., device A 102, makes a decision how to proceed based on the result of the comparison of the QoS levels in sub-step 514. If the second QoS level corresponding to the connection between the first communications device, e.g. device A 102, and the third communications device, e.g. device B 104, is greater than the recovered first QoS level, then operation proceeds from sub-step 516 to sub-step 518. In sub-step 518 the first communications device, e.g. device A 102, decides to transmit the transmission request response signal, e.g. signal 126, to the third communications device, e.g. device B 104. In such an event, the operation proceeds from sub-step 518 to step 524. However, if the recovered first QoS level is greater than the second QoS level corresponding to the connection between the first communications device, e.g., device A 102, and the third communications device, e.g., device B 104, then operation proceeds to from sub-step 516 to sub-step 520. In sub-step 520, the first communications device, e.g., device A 102, generates a channel quality estimate, e.g., an SIR, based on a received power of the first transmission request signal, e.g., signal 120 from the second communications, e.g., device C 108, to the access router 106, and based on a received power level of the second transmission request signal, e.g., signal 124 from the third communications device, e.g. device B 104. For example, an SIR level is calculated using received power of the second transmission request, e.g., measured received power of signal 124 from device B 104 as the signal power value, and received power level of the first transmission request signal, e.g., measured received power of signal 120 as an interference signal power value.

In some embodiments, a generated channel quality estimate in sub-step 520, above a threshold may be an indication that higher priority traffic data that may be transmitted from second communications device, e.g., device C 108, to access router 106 will be expected to cause an unacceptable level of interference to the first communications device, e.g., device A 102, in receiving and/or recovering traffic data from third communications device, e.g. device B 104. First communications device, e.g., device A 102, is aware, from step 514, that traffic data corresponding to the second communications device, e.g., device C 108, has a higher transmission priority than traffic data corresponding to its own connection. In some embodiments, this implies that the second communications device, e.g., device C, is more likely to transmit traffic data to the access router 106. In some such scenarios the first communications device, e.g. device A 102, refrains from transmitting the transmission request response, e.g. signal 126, which conveys to the third communications device, e.g., device B 104, a rejection of its transmission request, e.g. a rejection of the request of request signal 124. In some embodiments, in such a scenario, the first communications device, e.g., device A 102, has decided not to transmit the transmission request response since it expects that it will have poor reception and/or poor recovery of traffic data if it allowed the request transmission to proceed. The operation proceeds from sub-step 520 to sub-step 522.

In sub-step 522 a decision is made whether or not to transmit the transmission request response, e.g. signal 126, to third communications device, e.g. device B 104, based on the generated channel quality estimate of sub-step 520, when the second QoS level is lower than the recovered first QoS level. Depending on the decision made based on the generated channel quality estimate, the operation proceeds to step 524 or step 526. In some embodiments, the decision step 522 includes comparing the generated channel quality estimate with a threshold level and deciding to proceed based on the result of such a comparison. If the generated channel quality is below a threshold level indicating that transmission of traffic from second communications device, e.g. device C 108, to the access router 106 is not expected to cause a substantial interference problem to first communications device, e.g. device A 102, in receiving traffic data from third communications device, e.g., device B 104, then, in some embodiments, the first communications device, e.g. device A 102, decides to transmit the request response signal, e.g., signal 126, to the third communications device, e.g., device B 104. In such an event the operation proceeds to step 524 wherein the first communications device, e.g., device A 102, transmits the transmission request response signal, e.g. signal 126, to the third communications device, e.g. device B 104. Operation proceeds from step 524 to step 528.

On the other hand if the generated channel quality estimate is high, e.g., above a threshold then the first communications device, e.g. device A 102, in some embodiments, decides not to transmit a request response signal, e.g. signal 126, to third communications device, e.g. device B 104. In such an event, the operation proceeds from step 512 which includes sub-step 522, to step 526. In step 526 the first communications device, e.g., device A 102, refrains from transmitting the request response, e.g. signal 126, to the third communications device, e.g., device B 104. Operation proceeds from step 526 to step 528. In step 528, the operation goes back to step 504, and steps 504 through 512 may be, and sometimes are, repeated, for example, prior to receiving another pilot signal from the access router 106, and accordingly the first communications device, e.g., device A 102, transmits or refrains from transmitting a request response corresponding to another traffic slot.

Figure 6:
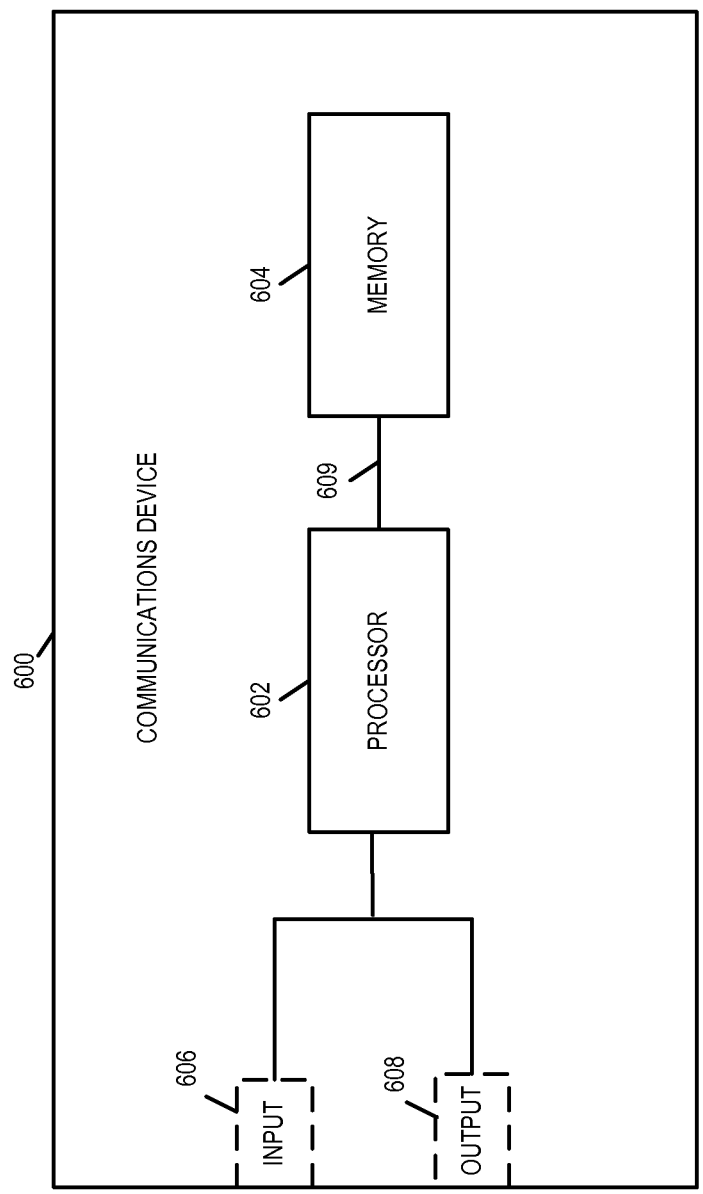
FIG. 6 is a drawing of an exemplary first communications device in accordance with an exemplary embodiment.

FIG. 6 is a drawing of an exemplary first communications device 600 in accordance with an exemplary embodiment. The first communications device 600 is, e.g., a mobile wireless terminal supporting peer to peer communications and implementing a method in accordance with flowchart 500 of FIG. 5. First communications device 600 is, e.g., communications device A 102 of system 100 of FIG. 1. Communications device 600 includes a processor 602 and memory 604 coupled together via a bus 609 over which the various elements (602, 604) may interchange data and information. Communications device 600 further includes an input module 606 and an output module 608 which may be coupled to the processor 602 as shown. However, in some embodiments the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: recover a first quality of service level from the first transmission request response signal which is in response to a first traffic transmission request signal; and make a decision, based on the recovered first quality of service level, whether or not to transmit a transmission request response signal in response to a second traffic transmission request signal. In some embodiments, the processor 602 is further configured to: receive said first transmission request response signal from an access router, the first transmission request response signal being in response to said first traffic transmission request signal, said first traffic transmission request signal being sent from a second communications device to said access router. In some embodiments, the processor 602 is further configured to: receive a pilot signal from the access router; generate, based on said pilot signal, an estimate of a channel between said access router and the first communications device 600, and use the generated channel estimate to interpret a phase of the received first transmission request response signal.

In some embodiments the processor 602 is further configured to compare the recovered first quality of service level to a second quality of service level corresponding to a connection between the first communications device 600 and the third communications device. In some such embodiments the processor 602 is further configured to decide to transmit when the second QoS level corresponding to the connection between the third communications device and said first communication device is higher than the recovered first QoS level.

In at least one embodiment, the processor 602 is further configured to: generate a channel quality estimate based on a received power of the second traffic transmission request signal and based on a received power of the first traffic transmission request signal, and decide whether or not to transmit based on the generated channel quality estimate when the second QoS level is lower than the recovered first QoS level. In at least some embodiments, the processor 602 is further configured to make multiple decisions whether or not to transmit traffic data in different transmission time slots, for example prior to receiving another pilot signal from the access router.

Figure 7:
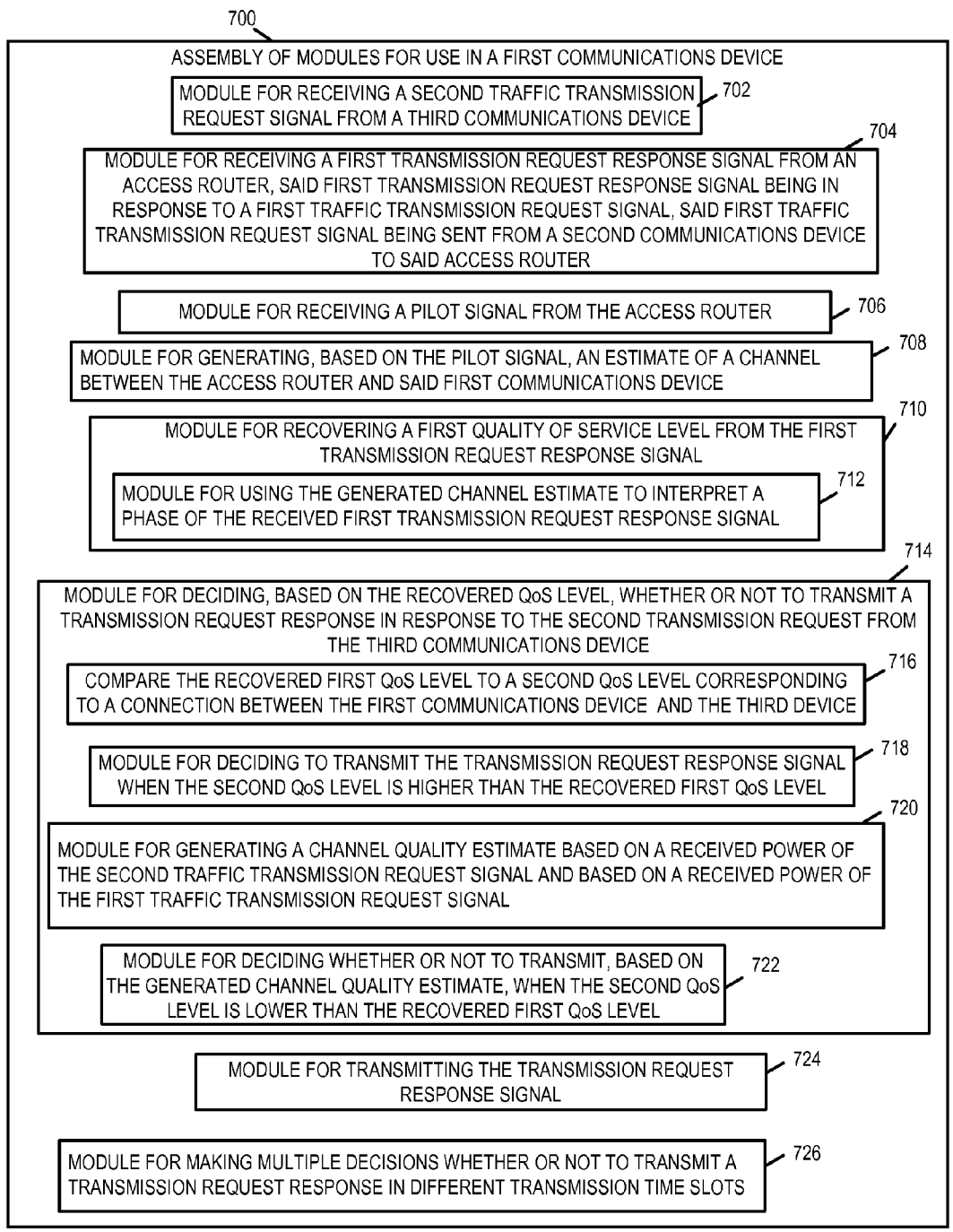
FIG. 7 illustrates an assembly of modules which can be used in the exemplary communications device of FIG. 6.

FIG. 7 is an assembly of modules 700 which can, and in some embodiments are, used in the communications device illustrated in FIG. 6. The modules in the assembly 700 can be implemented in hardware within the processor 602 of FIG. 6, e.g., as individual circuits. Alternatively, the modules may be implemented in software and stored in the memory 604 of the communications device shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated in the method flow chart 500 of FIG. 5.

As illustrated in FIG. 7, the assembly of modules 700 includes a module 702 for receiving a second traffic transmission request from a third communications device, a module 704 for receiving a first transmission request response signal from an access router, said first transmission request response being in response to a first traffic transmission request signal, said first traffic transmission request signal being sent from a second communications device to said access router, a module 706 for receiving a pilot signal from the access router, a module 708 for generating, based on said pilot signal, an estimate of a channel between said access router and said first communications device, a module 710 for recovering a first quality of service (QoS) level from the first transmission request response signal, which in some embodiments, also includes a module 712 for using the generated channel estimate to interpret a phase of the received first transmission request response signal. The assembly of modules 700 further includes a module 714 for deciding, based on the recovered first QoS level, whether or not to transmit a transmission request response signal in response to the second transmission request signal from the third communications device.

In at least one embodiment the module 714 includes: a module 716 for comparing the recovered first quality of service level to a second quality of service level, said second quality of service level corresponding to a connection between said first communications device and the third communications device, a module 718 for deciding to transmit the transmission request response signal, when the second QoS level corresponding to the connection between said first communications device and the third communications device is higher than the recovered first QoS level, a module 720 for generating a channel quality estimate based on a received power of the second traffic transmission request signal and based on a received power of the first traffic transmission request signal, and a module 722 for deciding whether or not to transmit, based on the generated channel quality estimate, when the second QoS level corresponding to the connection between said first communications device and the third communications device is lower than the recovered first QoS level.

The assembly of modules 700 further includes a module 724 for transmitting the transmission request response signal, and a module 726 for making multiple decisions whether or not to transmit a transmission request response signal in different transmission time slots, e.g., prior to receiving another pilot signal from the access router.

Figure 8:
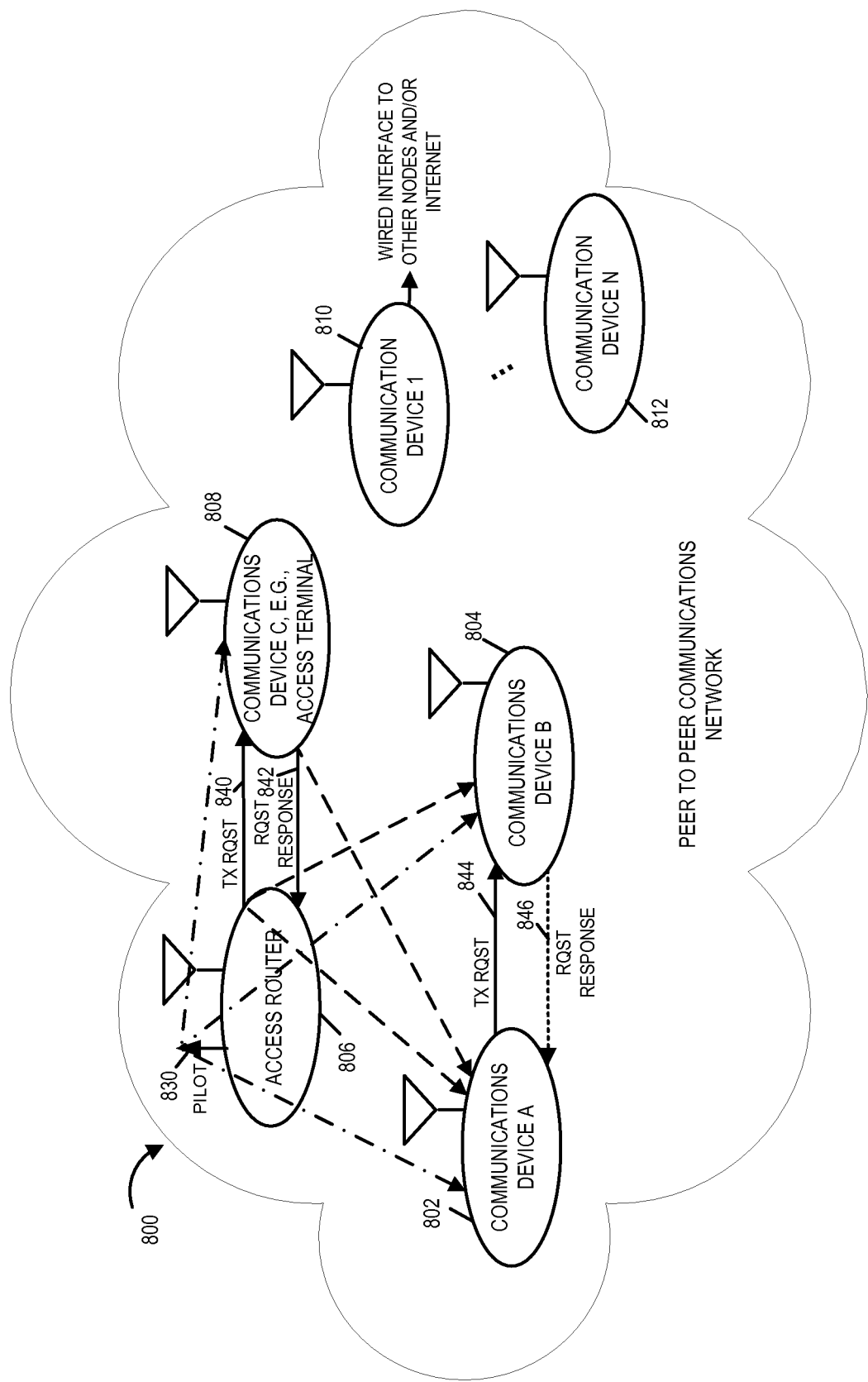
FIG. 8 illustrates an exemplary peer to peer communications network, e.g., an ad-hoc peer to peer communications network implemented in a local region, in accordance with an exemplary embodiment.

FIG. 8 illustrates an exemplary peer to peer communications network 800, e.g., an ad-hoc peer to peer communications network implemented in a local region, in accordance with an exemplary embodiment. FIG. 8 illustrates some features in accordance with an exemplary embodiment related to downlink communications between the access router 806 and communications device C 808 which is, e.g., an access terminal.

Exemplary communications network 800 includes a plurality of peer to peer wireless communications devices (communications device A 802, communications device B 804, communications device C 808, communications device 1 810, . . . , communications device N 812) and an access router 806, e.g., a base station. Although one access router has been shown in the communications network 800, it should be appreciated that the communications network may, and sometimes does, include several access routers. The wireless communications devices (802, 804, 808, 810, . . . , 812) support various signaling between peers, e.g., peer discovery signals, transmission request signals, transmission request response signal, etc., and data transmissions between peers. Some of the peer to peer communications devices, e.g., communications device 1 810, also include a wired interface, which couples the peer to peer communications device to other nodes and/or the Internet, in addition to a wireless communications interface. Some of the peer to peer communications devices are mobile communications devices, e.g., handheld mobile communications devices.

In accordance with one exemplary embodiment, the access router 806 sends a transmission request signal 840 to a peer to peer device in the network, e.g., communications device C 808. The phase of the transmission request signal 840 from the access router 806 carries QoS information, e.g., a QoS level communicating a transmission priority. In some embodiments, the transmission request signal 840 is a single tone signal, i.e., a signal communicated using a single OFDM tone. In some such embodiments, such a single tone signal is communicated during a single OFDM transmission time interval, e.g., the single tone signal is communicated using one OFDM tone-symbol. In some embodiments, different sets of OFDM tone-symbols in a timing/frequency structure are associated with different signals, e.g., request signals, request response signals, pilot signals, beacon signals, etc.

In some embodiments transmission request signal 840 is communicated using a single tone. In some such embodiments the phase of the transmission response signal 840 communicates a quality of service (QoS) level, e.g., a transmission priority. In accordance with an exemplary embodiment, the wireless communications devices (802, 804, 808, 810, . . . , 812) are aware of access routers in the system 800 including access router 806. In some such embodiments, the communications devices (802, 804, 808, 810, . . . , 812) track the channel to one or more of the access routers in the network 800 including the access router 806, that the communications devices (802, 804, 808, 810, . . . , 812) can currently detect, e.g., hear. For example, consider that communications device A 802 has been able to detect access router 806 and has been tracking the channel between access router 806 and itself. Further consider that communications device B 804 has been able to detect access router 806 and has been tracking the channel between access router 806 and itself device. Further consider that communications device A 802 and communications device B 804 also receive the transmission request signal 840 transmitted from the access router 806 to communications device C 808. Using the tracked channel conditions, communications device A 802 and communications device B 804 are able to recover information communicated in the transmission request signal 840, e.g. QoS level information communicated in the phase of transmission request signal 840.

In some embodiments the communications device C 808 may, and sometimes does, respond to the access router 806 by sending a transmission request response signal 842, if communications device C 808 acquiesces to the transmission request 840.

As shown in FIG. 8, peer to peer communications device A 802 seeks to transmit data, e.g., traffic data, to peer to peer communications device B 804. Thus communications device A 802 sends a transmission request signal 844 to the communications device B 804. In some embodiments the communications device B 804 sends a request response signal 846 back to the communications device A 802, if communications device B 804 acquiesces to the request of signal 844. In some embodiments, the request response signal 846 communicates to communications device A 802 that communications device B 804 is agreeable to receive traffic data from communications device A 802. In some embodiments, communications device B 804 decides whether or not to transmit request response signal 846 in response to the transmission request signal 844 based on whether or not one or more conditions are satisfied. For example, in one exemplary embodiment communications device B 804 recovers the QoS level from the phase of the received transmission request signal 840. If the recovered QoS level from signal 840 indicates that traffic data to be communicated from the access router 806 to the communications device C 808 has a higher priority than the priority associated with traffic to be communicated from communications device A 802 to communications device B 804, then communications device B 804 may, and sometimes does, decide not to transmit the request response signal 846.

In some embodiments, the decision of whether or not to transmit the request response signal 846 is based on additional criteria, in addition to criteria based on detection of an intended higher priority traffic transmission corresponding to another connection. For example, consider that communications device B 804 determines that a QoS level associated with traffic on its own connection does not indicate a higher priority than the QoS level associated with intended traffic from the access router 806 to device C 808. Following this determination, in some embodiments, communications device B 804 decides whether or not to transmit the request response signal 846 based on a channel quality estimate, e.g., an SIR. The channel quality is generated, e.g., using the received power of the request signal 840 from access router 806 and received power of the request signal 844 from communications device A 802.

In some embodiments, in the event that request response 846 is transmitted by communications device B 804 and is received by the communications device A 802, communications device A 802 decide whether or not to transmit traffic data to the communications device B 804 based on whether or not one or more conditions are satisfied. In one exemplary embodiment communications device A 802 recovers a QoS level from the phase of the received request signal 840. In some such embodiments, the communications device A 802 uses a generated channel estimate for a channel between communications device A 802 and the access router 806, to interpret the phase of the received request signal 840, e.g., recovering the QoS level from the phase. The channel estimate is sometimes generated by communications device A 802 using a pilot signal 830 received from the access router 806. The communication device A 802 is aware of the transmission priority level of the traffic data that communications device A 802 wishes to transmit to communications device B 804. In some embodiments, if the recovered QoS level indicates that the traffic data to be communicated from access router 806 to the communications device C 808 has a higher priority, as indicated by the recovered QoS level, than the priority associated with its own intended traffic transmission, then communications device A 802 may, and sometimes does, decide to yield, i.e., not transmit its traffic data to communications device B 804 in the current transmission slot. In some embodiments, communications device A 802 decides whether or not to transmit its traffic data to device B 804 based on predetermined criteria. In some embodiments, the transmitter yielding decision by communications device A 802 is made to facilitate communication of higher priority traffic data from the access router 806 to the communications device C 808. Thus the transmitter yielding of communications device A 802 allows traffic from access router 806 to communications device C 808 to occur without interference from traffic transmissions between communications device A 802 and communications device B 804 in the same traffic air link resource, e.g., same traffic segment.

Figure 9:
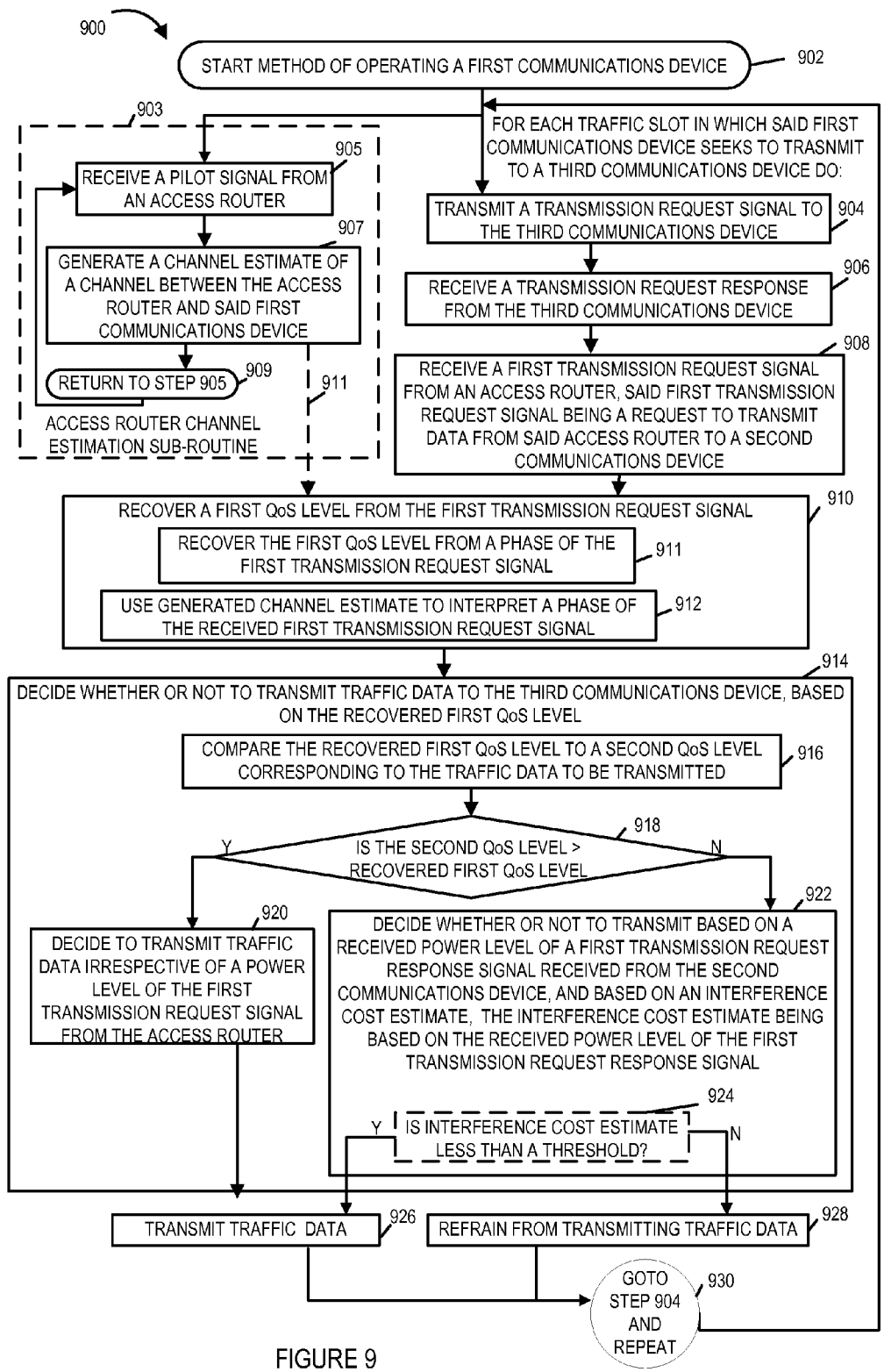
FIG. 9 is a flowchart 900 of an exemplary method of operating a first communications device in accordance with an exemplary embodiment.

FIG. 9 is a flowchart 900 of an exemplary method of operating a first communications device, e.g., communications device A 802 of FIG. 8, in accordance with an exemplary embodiment. Operation of the exemplary method starts in step 902 where the first communications, e.g., device A 802 is powered on and initialized. In accordance with an exemplary embodiment, for each traffic slot in which the first communications device, e.g., device A 802, seeks to transmit to a third communications device, e.g., communications device B 804, various steps of flowchart 900 are performed as discussed below. In some embodiments, the first communications device, e.g., device A 802, also executes the channel estimation sub-routine 903, for generating a channel estimate for a channel between the first communications device A 802 and access router 806, in parallel with various other steps in flowchart 900.

Channel estimation sub-routine 903 implements a channel estimation process for the channel between the communications device implementing the exemplary method, which in this example is communications device A 802, and an access router 806. The sub-routine includes steps 905, 907 and 909 which are performed at a different rate, e.g., a slower rate, than the rate at which other steps of flowchart 900 are performed. For example, the execution of sub-routine 903 may be repeated after a time period which includes multiple traffic slots in which the first communications device A 802 seeks to transmit traffic data to the third communications device, e.g., device B 804.

In step 905, communications device A 802 receives a pilot signal, e.g., pilot signal 830, from the access router 806. Operation proceeds from step 905 to step 907 wherein the first communications device A 802 generates a channel estimate of a channel between the access router 806 and device A 802. In accordance with an exemplary embodiment, the generated channel estimate is sometimes used by the first communications device A 802 to interpret phase of the transmission response signal 840. The arrow 911 represents that the generated channel estimate is available to the device A 802 and may be used in step 910. The operation proceeds from step 907 to return 909 from where the operation proceeds back to step 905. As discussed previously, sub-routine 903 may be, and sometimes is, repeated, e.g., after a predetermined time period in accordance with an implemented timing structure.

Operation proceeds from start step 902 to step 904. In step 904 the first communications device, e.g. device A 802, transmits a transmission request signal, e.g., transmission request signal 844, to the third communications device, e.g., communications device B 804. The operation proceeds from step 904 to step 906 where the first communications device, e.g., device A 802, receives a transmission request response signal, e.g., request response signal 846, from the third communications device, e.g. device B 804. The request response signal 846 is in response to the transmission request signal 844 sent from first communications device, e.g., device A 802, to third communications device, e.g., device B 804. Operation proceeds from step 906 to step 908.

In step 908 first communications, e.g., device A 802, receives a first transmission request signal, e.g., transmission request signal 840, from an access router, e.g., access router 806. The transmission request signal 840 is a request signal to transmit traffic data from the access router 806 to a second communications device, e.g., communications device C 808 of FIG. 8. In some embodiments, the transmission request signal 840 from the access router 806 is a single tone signal. In some embodiments, the phase of the transmission request signal 840 carries QoS information. In some embodiments, the QoS information conveys a traffic transmission priority corresponding to the intended traffic data from the access router 806 to the second communications device, e.g., device C 108, e.g. corresponding to the traffic slot. The operation proceeds from step 908 to step 910.

In step 910, the first communications device, e.g., device A 802, recovers a first QoS level from the first transmission request signal, e.g. signal 840, directed to the second communications device, e.g., device C 808. In some embodiments, first communications device, e.g. device A 802, as part of recovering a QoS level in step 910, also performs sub-steps 911 and 912. In sub-step 911 the QoS level is recovered from a phase of the received first transmission request signal, e.g. transmission request signal 840. In sub-step 912, the first communications device uses the generated channel estimate, e.g., from step 207, to interpret the phase of the received first transmission request signal, e.g., the phase of signal 840. The first communications device, e.g. device A 802, in some embodiments, compensates for phase and/or amplitude distortions caused by the channel in order to properly decode the phase of the received first transmission request signal, e.g., signal 840. Thus, in some embodiments, first communications device, e.g., device A 802, generates a channel estimate, and subsequently uses the generated channel estimate to adjust for channel conditions when decoding the phase of a signal from the access router, e.g., transmission request signal 840. The use of channel estimation information facilitates effective reading of the phase of the transmission request signal 840 and the retrieval of the QoS level being conveyed in signal 840 by the first communications device, e.g., device A 802. The operation proceeds from step 910 to step 914.

In step 914 the first communications device, e.g., device A 802 decides, based on the recovered first QoS level, whether or not to transmit its traffic data to the third communications device, e.g., device B 804. In some embodiments, step 914 includes one or more of various sub-steps 916, 918, 920, 922 and 924. In sub-step 916, the first communications device, e.g., device A 802, compares the recovered first QoS level from the first transmission request signal, e.g., signal 840, to a second QoS level corresponding to the traffic data to be transmitted from first communications device, e.g., device A 802 to the third communications device, e.g., device B 804. In some such embodiments the QoS levels are, e.g., a traffic transmission priority level for the traffic to be transmitted from one communications device to another communications device. In at least one embodiment, recovered first QoS level from the signal 840 represents a traffic transmission priority for the traffic data that the access router 806 intends to transmit to the second communications device, e.g., device C 808. Operation proceeds from sub-step 916 to sub-step 918.

In sub-step 918, the first communications device, e.g., device A 802, makes a decision how to proceed based on the result of the comparison of the QoS levels in sub-step 916. If the second QoS level corresponding to traffic data that the first communications device, e.g. device A 802, intends to transmit is greater than the recovered first QoS level corresponding to traffic data that the access router 806 intends to transmit, then the operation proceeds to sub-step 920. In sub-step 920 the first communications device, e.g., device A 802, decides to transmit the traffic data irrespective of a power level of the first transmission request signal, e.g., signal 840 from the access router 806. In such an event, the operation proceeds from step 920 to step 926.

However, if the second QoS level is lower than the recovered first QoS level, then the operation proceeds from step 918 to sub-step 922. In sub-step 922 the first communications device, e.g., device A 802, decides whether or not to transmit, based on a received power level of the first transmission request response signal, e.g., signal 842, from the second communications device, e.g., device C 808, and based on an interference cost estimate, said interference cost estimate being based on the received power level of the first transmission request response signal, e.g. signal 842. In some embodiments an interference cost estimate, e.g., an SIR level, is calculated by the first communications device, e.g. device A 802 as a part of the decision making sub-step 922. The power level of the received first transmission request response signal, e.g., signal 842, is, in some embodiments, used to provide an indication of proximity of the second communications device, e.g., device C 808, with respect to the first communications device, e.g. device A 802. This is of practical importance because if the first communications device, e.g. device A 802, and second device, e.g. device C 808, are in close proximity then traffic data transmissions from the first communications device, e.g. device A 802 directed to the third communications device, e.g., device B 804, may cause substantial interference to device C 108 when it is attempting to receive and recover the higher priority traffic data from the access router 806, if both traffic data transmission use the same air link traffic resources, e.g., same traffic segment.

If the communications devices (802, 804, 810, ..., 812) in the peer to peer communications network 100 are aware of a higher priority of the traffic data from the access router 106 to third communications device, e.g., device C 808, than the priority associated with its own intended traffic transmission, the communications devices (802, 804, 810, ..., 812) make their transmission decision by considering the interference problems that they may cause to the higher priority traffic transmitting/receiving device pair (806, 808). Thus, using power level of the first transmission request response signal, e.g. signal 842, as received by the first communications device, e.g. device A 802, an interference cost estimate is calculated by first communications device, e.g. device A 802. In some embodiments, sub-step 922 also includes a sub-step 924. In sub-step 924 the calculated interference cost estimate is compared to, e.g., a threshold, to determine if the first communications, e.g., device A 802, is expected to cause interference above a threshold level to the second communications device, e.g. device C 808 which is expected to be receiving higher priority traffic from the access router 806. If the interference cost estimate is less than the threshold the first communications device, e.g., device A 802, decides to transmit traffic data and the operation proceeds from sub-step 924 to step 926. In step 926, the first communications device, e.g. device A 802, transmits the traffic data to the third communications device, e.g. device B 804.

However, if the calculated interference cost is over the threshold level then a decision not to transmit traffic data is made by the first communications device, e.g. device A 802. In such a situation operation proceeds from sub-step 922 to step 928, where the first communications device, e.g. device A 802, is controlled to refrain from transmitting the traffic data in this traffic slot. Depending on whether the first communications device, e.g. device A 802, transmits or not, operation proceeds from step 926 or 928 to step 930. In step 930, the operation goes back to step 904, and steps 904 through 914 may, and sometimes are, repeated by the first communications device, e.g. device A 802. For example, prior to receiving another pilot signal from the access router 806 another iteration of steps 904 through 914, and one of steps 926 and 918 is performed. Thus in some embodiments, the same channel estimate between the first communications device and the access router is used in recovering information used for making multiple transmitter yielding decisions corresponding to multiple traffic slots.

Figure 10:
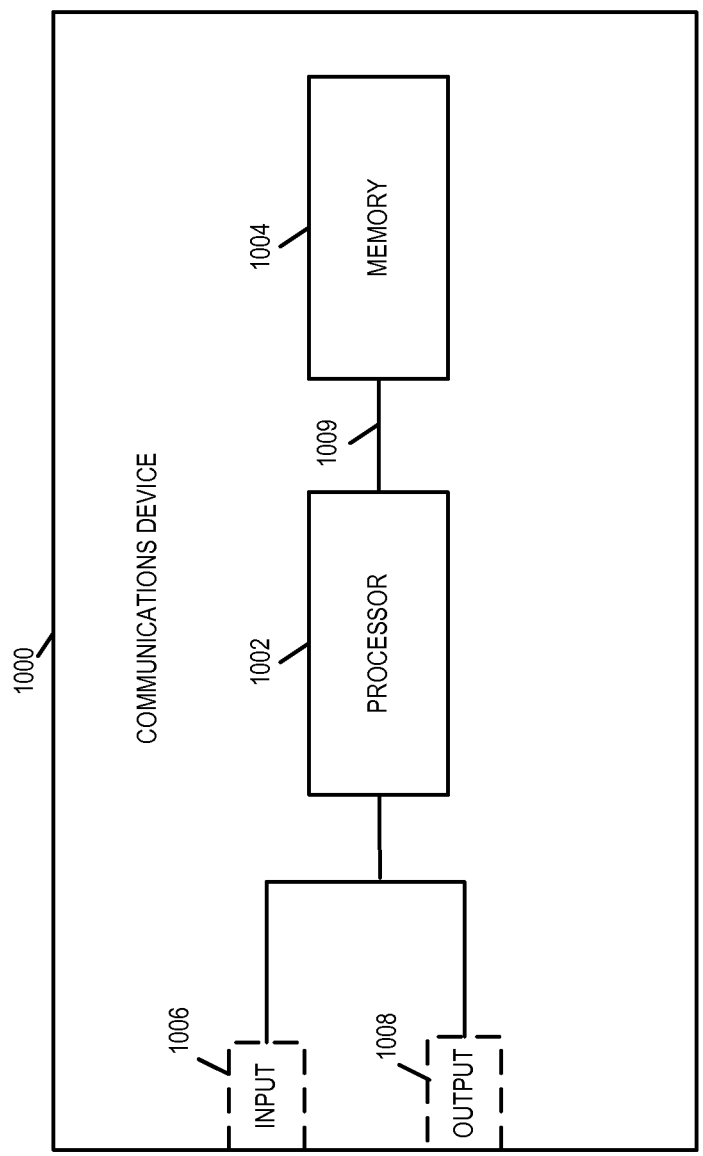
FIG. 10 is a drawing of an exemplary communications device in accordance with an exemplary embodiment.

FIG. 10 is a drawing of an exemplary communications device 1000 in accordance with an exemplary embodiment. Communications device 1000 is, e.g., a mobile wireless terminal supporting peer to peer communications and implementing a method in accordance with flowcharts 900 of FIG. 9. First communications device 1000 is, e.g., communications device A 802 of system 800 of FIG. 8. Communications device 1000 includes a processor 1002 and memory 1004 coupled together via a bus 1009 over which the various elements (1002, 1004) may interchange data and information. Communications device 1000 further includes an input module 1006 and an output module 1008 which may be coupled to the processor 1002 as shown. However, in some embodiments the input module 1006 and output module 1008 are located internal to the processor 1002. Input module 1006 can receive input signals. Input module 1006 can, and in some embodiments does, include a wireless receiver and/or a wired or optical input interface for receiving input. Output module 1008 may include, and in some embodiments does include, a wireless transmitter and/or a wired or optical output interface for transmitting output. Processor 1002 is configured to: recover a first quality of service (QoS) level from a first transmission request signal directed to a second communications device; and make a decision whether or not to transmit traffic data to a third communications device based on the recovered first QoS level.

The processor 1002 is further configured to: receive the first transmission request signal from an access router, said first transmission request signal being a request to transmit data from said access router to the second communications device. In some embodiments, recovering the first QoS level includes recovering the QoS level from a phase of the first transmission request signal. In some embodiments, the processor 1002 is further configured to: receive a pilot signal from the access router, generate, based on the received pilot signal, a channel estimate of a channel between said access router and said communications device 1000, and use the generated channel estimate to interpret a phase of the received first transmission request signal, the phase of the first transmission request signal indicating the first quality of service level.

In some embodiments the processor 1002 is further configured to compare the recovered first QoS level to a second QoS level corresponding to said traffic data. In at least some embodiments the processor 1002 is further configured to decide to transmit irrespective of a received power level of the first transmission request signal when the second QoS level is higher than the recovered first QoS level. In some embodiments, the processor 1002 is further configured to decide whether or not to transmit, when the second QoS is lower than the recovered first QoS level, based on a received power level of a first transmission request response signal received from the second communications device and based on an interference cost estimate, said interference cost estimate being based on the received power level of the first transmission request response signal.

In at least some embodiments, the processor 1002 is further configured to make multiple decisions whether or not to transmit traffic data in different transmission time slots. In some embodiments, the processor 1002 is configured to make said multiple decisions, e.g., prior to receiving another pilot signal from the access router.

Figure 11:
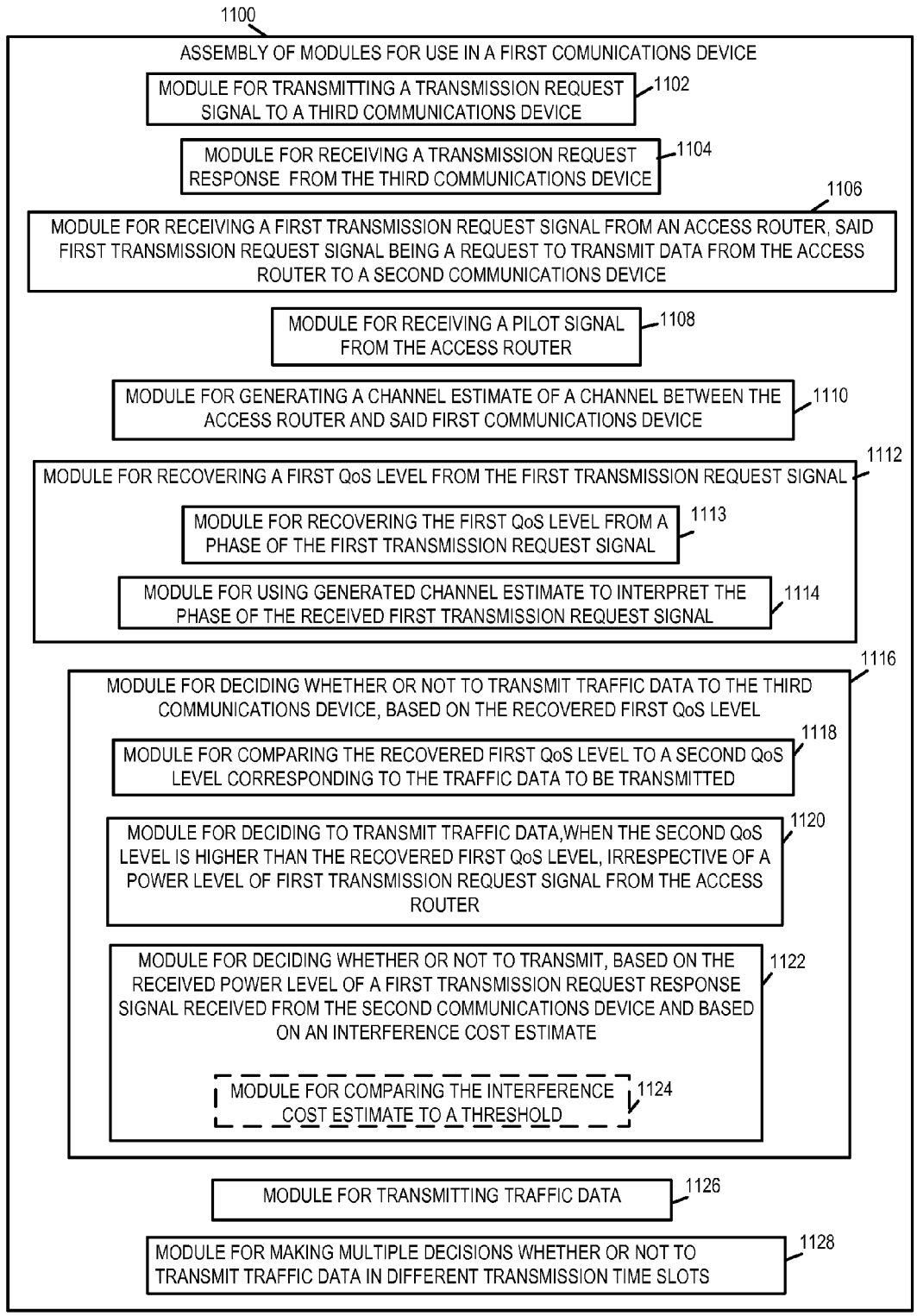
FIG. 11 illustrates an assembly of modules which can be used in the exemplary communications device of FIG. 10.

FIG. 11 is an assembly of modules 1100 which can, and in some embodiments are, used in the communications device 1000 illustrated in FIG. 10. The modules in the assembly 1100 can be implemented in hardware within the processor 1002 of FIG. 10, e.g., as individual circuits. Alternatively, the modules may be implemented in software and stored in the memory 1004 of the communications device 1000 shown in FIG. 10. While shown in the FIG. 10 embodiment as a single processor, e.g., computer, it should be appreciated that the processor 1002 may be implemented as one or more processors, e.g., computers. When implemented in software the modules include code, which when executed by the processor, configure the processor, e.g., computer, 1002 to implement the function corresponding to the module. In embodiments where the assembly of modules 1100 is stored in the memory 1004, the memory 1004 is a computer program product comprising a computer readable medium comprising code, e.g., individual code for each module, for causing at least one computer, e.g., processor 1002, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 11 control and/or configure the communications device 1000 or elements therein such as the processor 1002, to perform the functions of the corresponding steps illustrated in the method flowchart 900 of FIG. 9.

As illustrated in FIG. 11, the assembly of modules 1100 includes a module 1102 for transmitting a transmission request signal to a third communications device, a module 1104 for receiving a transmission request response from the third communications device, a module 1106 receiving a first transmission request signal from an access router, said first transmission request signal being a request to transmit data from said access router to a second communications device, a module 1108 for receiving a pilot signal from the access router, a module 1110 for generating, e.g., based on the received pilot signal, a channel estimate of a channel between the access router and the first communications device 1000, a module 1112 for recovering a first quality of service (QoS) level from the first transmission request signal, and a module 1116 for deciding whether or not to transmit traffic data to a third communications device based on the recovered first quality of service level. The assembly of modules 1100 further includes a module 1126 for transmitting traffic data, and a module 1128 for making multiple decisions whether or not to transmit traffic data in different transmission time slots, for example, prior to receiving another pilot signal from the access router.

In at least some embodiments the module 1112 includes a module 1113 for recovering the first QoS level from a phase of the first transmission request signal, and a module 1114 for using the generated channel estimate to interpret the phase of the first transmission request signal. In some embodiments, the module 1116 for deciding includes: a module 1118 for comparing the recovered first QoS level to a second QoS level, said second quality of service level corresponding to said traffic data to be transmitted, a module 1120 for deciding to transmit the traffic data when the second QoS level is higher than the recovered first QoS level, irrespective of a received power level of the first transmission request signal, a module 1122 for deciding whether or not to transmit, when the second QoS level is lower than the recovered first QoS level, based on a received power level of a first transmission request response signal received from said second communications device and based on an interference cost estimate, the interference cost estimate being based on the received power level of the first transmission request response signal. In some embodiments the module 1122 includes a module 1124 for comparing the interference cost estimate to a threshold.

Figure 12:
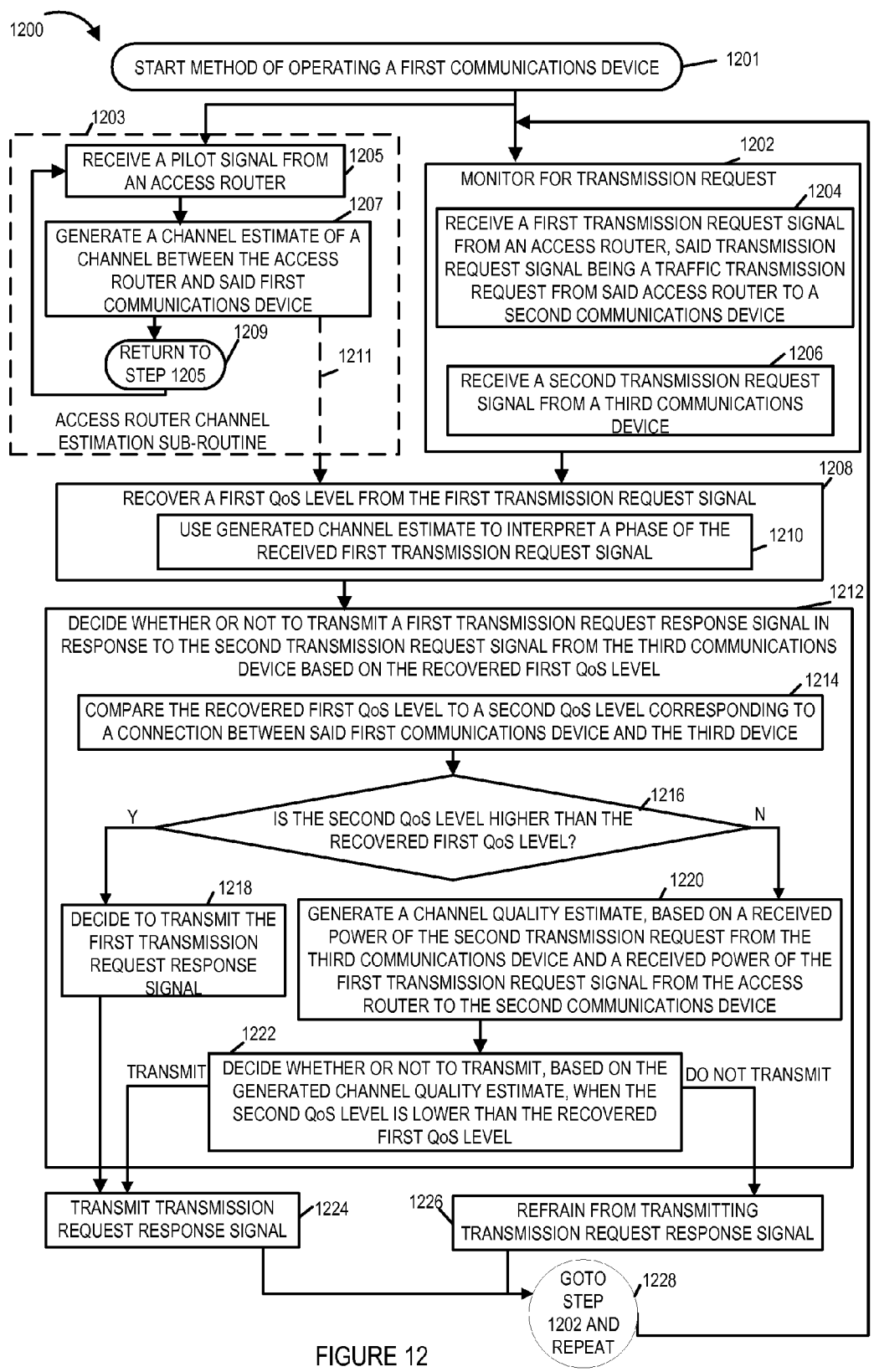
FIG. 12 is a flowchart of an exemplary method of operating a first communications device in accordance with an exemplary embodiment.

FIG. 12 is a flowchart 1200 of an exemplary method of operating a first communications device, e.g., communications device B 804 of FIG. 8, in accordance with an exemplary embodiment. Operation of the exemplary method starts in step 1201 where the first communications device, e.g. device B 804, is powered on and initialized. Operation proceeds from start step 1201 to step 1202 and, in some embodiments, to step 1203. In some embodiments, the first communications device, e.g., device B 804, also executes the channel estimation sub-routine 1203 in parallel with various other steps in flowchart 1200. In step 1205, the first communications device, e.g., device B 804, receives a pilot signal 830 from the access router 806. In step 1207, using the received pilot signal 830 the first communications device, e.g., device B 804, generates a channel estimate for a channel between first communications device, e.g., device B 804, and the access router 806, and the process repeats after a time period of time, e.g., in accordance with a predetermined timing structure. In accordance with an exemplary embodiment, the generated channel estimate may, and sometimes is, used by the first communications device, e.g., device B 804, to interpret phase of the transmission request signal, e.g. signal 840. The arrow 1211 represents that generated channel estimate is available to the first communications device, e.g., device B 804, and may be used by the first communications device, e.g., device B 804, in implementing the method of flowchart 1200.

In step 1202 the first communications device, e.g. device B 804, monitors for transmission request signals that other devices may have transmitted to the first communications device, e.g. to device B 804. In at least one exemplary embodiment, step 1202 includes sub-steps 1204 and 1206. In sub-step 1204 the first communications device, e.g. device B 804, receives a first transmission request signal, e.g., transmission request signal 840, from an access router, e.g., access router 806. The first transmission request signal 840 is a traffic transmission request from the access router 806 to a second communications device, e.g., communications device C 808. In some embodiments, the first transmission request signal, e.g. signal 840, is a single tone signal. In some embodiments, the phase of the first transmission request signal, e.g., the phase of signal 840, carries QoS information. In some embodiments, the QoS information conveys a traffic transmission priority for transmission of the traffic data for which the transmission request 840 was made by the access router 806. In sub-step 1206 the first communications device, e.g., device B 804, receives a second transmission request signal, e.g., transmission request signal 844, from a third communications device, e.g., communications device A 802. The operation proceeds from step 1202 to step 1208.

In step 1208, the first communications device, e.g. device B 804, recovers a first QoS level from the first transmission request signal, e.g. from signal 840. In some embodiments the first communications device, e.g. device B 804, recovers the first QoS level from a phase of the first transmission request signal, e.g. from the phase of signal 840. In some embodiments, the first communications device, e.g. device B 804, as part of recovering the first QoS level in step 1208, performs sub-step 1210. In sub-step 1210, the first communications device, e.g., device B 804, uses the generated channel estimate, e.g., from step 1207, to interpret a phase of the received first transmission request signal 840.

Operation proceeds from step 1208 to step 1212. In step 1212 the first communications device, e.g. device B 804, decides, based on the recovered first QoS level, whether or not to transmit a first transmission request response signal, e.g., request response signal 846, in response to the second transmission request signal, e.g. signal 844, from the third communications device, e.g., device A 802. In some embodiments, step includes one or more of sub-steps 1214, 1216, 1218, 1220 and 1222. In sub-step 1214, the first communications device, e.g., device B 804, compares the recovered first QoS level to a second QoS level corresponding to a connection between the first communications device, e.g. device B 804, and the third communications device, e.g., device A 802. In some embodiments, there is a connection identifier associated with the connection between the third communications device, e.g. device A 802, and the first communications device B, e.g. device 804. In some such embodiments there is a QoS level associated with such a connection identifier. In some such embodiments the QoS level is, e.g., a traffic transmission priority level for the traffic to be transmitted from the third communications device, e.g. device A 802, to first communications device, e.g., device B 804. Thus in at least one embodiment, in sub-step 1214 a comparison is performed between the traffic transmission priority indicated by the recovered QoS level and transmission priority of the traffic data to be transmitted from third communications device, e.g. device A 802, to the first communications device, e.g. device B 804. Operation proceeds from sub-step 1214 to sub-step 1216.

In sub-step 1216, the first communications device, e.g. device B 804, makes a decision how to proceed based on the result of the comparison of the QoS levels in sub-step 1214. If the second QoS level corresponding to the connection between third communications device, e.g. device A 802, and second communications device, e.g., device B 804, is greater than the recovered first QoS level, e.g., the QoS level recovered from phase of request signal 840, the operation proceeds from sub-step 1216 to sub-step 1218. In sub-step 1218 the first communications device, e.g. device B 804, decides to transmit the first transmission request response signal, e.g., signal 846, to the third communications device, e.g. to device A 802. In such a situation, the operation proceeds from step 1218 to step 1224. However, if the recovered first QoS level is greater than the second QoS level corresponding to the connection between the third device, e.g., device A 802, and the first communications device, e.g., device B 804, then operation proceeds from sub-step 1216 to sub-step 1220. In sub-step 1220, the first communications device, e.g., device B 804, generates a channel quality estimate, e.g., an SIR, based on a received power of the second transmission request signal, e.g. signal 844, received from the third communications device, e.g., device A 802, and a received power level of the first transmission request signal, e.g. signal 840, from the access router 806 to the second communications device, e.g., device C 808. For example, in some embodiments, an SIR level is calculated using the received power of the second transmission request signal 844 as the signal power and received power level of the first transmission request signal 840 from the access router 806 as the interference signal power.

A generated channel quality estimate from sub-step 1220, which exceeds a threshold, in some embodiments, is an indication that the higher priority traffic data that is intended be transmitted from the access router 806 to device C 808, is expected to cause an unacceptable level of interference to the first communications device, e.g. device B 804, in receiving and/or recovering traffic data from the third communications device, e.g. device A 802. Since the first communications device, e.g., device B 804, is aware that traffic data corresponding to the access router 806 has a higher transmission priority than its own priority, and thus access router 806 is more likely to transmit traffic data to the second communications device, e.g. device C 808, the first communications device, e.g. device B 804, in some embodiments, refrains from transmitting the transmission request response 846. Thus in such a situation, first communications device, e.g. device B 804, performs receiver yielding and does not approve the transmission request for this traffic slot, since it expects that if it has acquiesced in the intended traffic transmission of request 844 it would have had poor reception of traffic data from the third communications device, e.g., device A 802. The operation proceeds from sub-step 1220 to sub-step 1222.

In sub-step 1222 a decision is made whether or not to transmit the first request response signal, e.g. signal 846, to third communications device, e.g. device A 802, based on the generated channel quality estimate in sub-step 1220. Depending on the decision made based on the generated channel quality estimate, the operation may proceed to step 1224 or step 1226. In some embodiments, the decision step 1222 includes comparing the generated channel quality estimate of sub-step 1220 with a threshold level and deciding to proceed based on the result of such a comparison. If the generated channel quality is below a threshold level, indicating that transmission of traffic from the access router 806 to second communications device, e.g., device C 808, is not expected to cause a substantial interference problem to the first communications device, e.g., device B 804, in receiving traffic data from third communications, e.g. device A 802, then the first communications device, e.g. device B 804, in some embodiments, decides to transmit the first transmission request response signal, e.g. signal 846, to the third communications device, e.g. device A 802. In such a situation the operation proceeds from sub-step 1222 to step 1224. In step 1224 the first communications device, e.g., device B 804, transmits the first transmission request response signal, e.g. signal 846, to the third communications device, e.g. device A 802. On the other hand if the generated channel quality estimate of step 1220 is above the threshold then the first communications device, e.g. device B 804, in some embodiments, decides not to transmit first transmission request response signal, e.g. signal 846, to the third communications device, e.g. device A 802. In such situation, the operation proceeds from step 1212 which includes sub-step 1222, to step 1226. In step 1226 the first communications device, e.g., device B 804 is controlled to refrain from transmitting the first transmission request response signal, e.g. signal 846, to the third communications device, e.g. device A 802. Depending on whether the first communications device, e.g. device B 804, transmits or not, operation proceeds from step 1224 or 1226 to step 1228. In step 1228, the operation goes back to step 1202, and steps 1203 through 1212 may be, and sometimes are, repeated by the first communications device, e.g. device B 804. In one example the steps 1203 through 1212 are repeated, corresponding to another traffic slot, prior to receiving another pilot signal from the access router 806. Thus, in at least some embodiments, the same channel estimate between the access router and the first communications device, e.g., from step 1207, is used in multiple traffic slots to recover information utilized in making multiple traffic transmission decisions.

Figure 13:
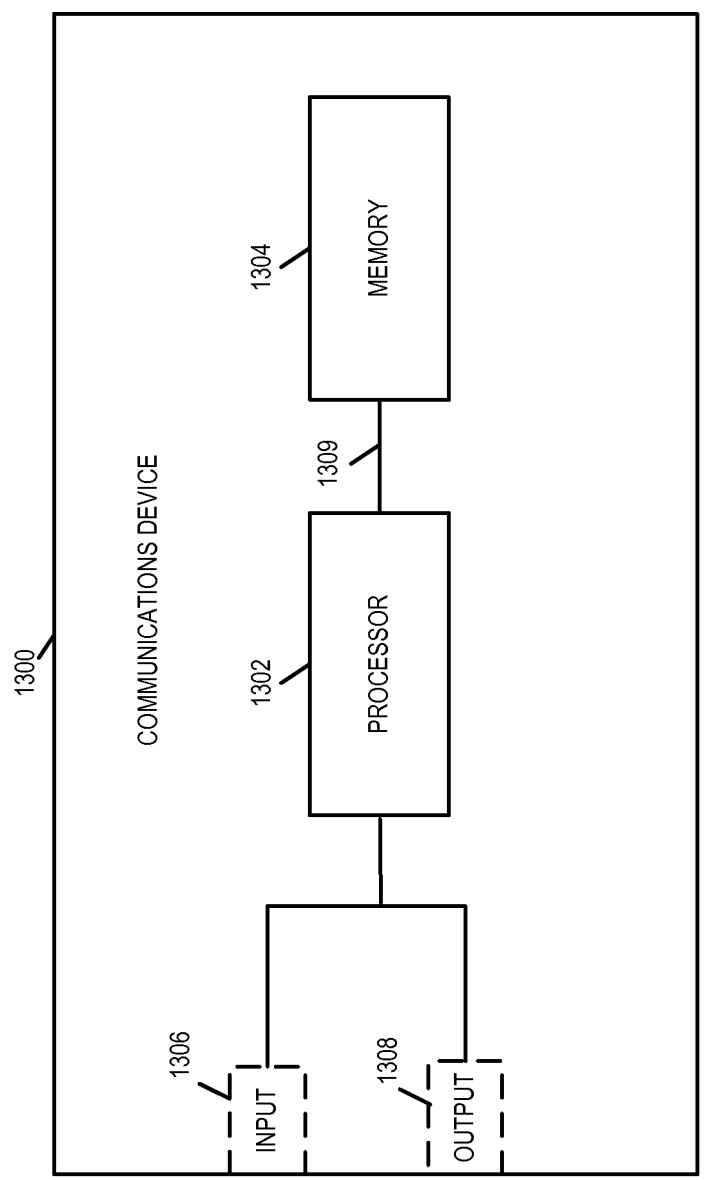
FIG. 13 is a drawing of an exemplary communications device in accordance with an exemplary embodiment.

FIG. 13 is a drawing of an exemplary communications device 1300 in accordance with an exemplary embodiment. Communications device 1300 is, e.g., a mobile wireless terminal supporting peer to peer communications and implementing a method in accordance with flowcharts 1200 of FIG. 12. Communications device 1300 is, e.g., communications device B 804 of system 800 of FIG. 8. Communications device 1300 includes a processor 1302 and memory 1304 coupled together via a bus 1309 over which the various elements (1302, 1304) may interchange data and information. Communications device 1300 further includes an input module 1306 and an output module 1308 which may be coupled to the processor 1302 as shown. However, in some embodiments the input module 1306 and output module 1308 are located internal to the processor 1302. Input module 1306 can receive input signals. Input module 1306 can, and in some embodiments does, include a wireless receiver and/or a wired or optical input interface for receiving input. Output module 1308 may include, and in some embodiments does include, a wireless transmitter and/or a wired or optical output interface for transmitting output.

Processor 1302 is configured to: recover a first quality of service (QoS) level from a first transmission request signal, and make a decision whether or not to transmit a first transmission request response signal in response to a second transmission request signal based on the recovered first QoS level. In some embodiments second transmission request signal is from a third communications device. In some embodiments, the processor 1302 is further configured to receive a first transmission request signal from an access router, said first transmission request signal being a traffic transmission request from said access router to a second communications device.

In some embodiments, the processor 1302 is further configured to: receive a pilot signal from the access router, generate a channel estimate of a channel between said access router and said communications device 1300, and use the generated channel estimate to interpret a phase of the received first transmission request signal.

In some embodiments, the processor 1302 is further configured to compare the recovered first QoS level to a second QoS level, said second QoS level corresponding to a connection between the third communications device and the communications device 1300. In at least some embodiments, the processor 1302 is further configured to decide to transmit the first transmission request response signal when the second QoS level corresponding to the connection between the third communications device and said communications device 1300 is higher than the recovered first QoS level. In some embodiments, the processor 1302 is further configured to: generate a channel quality estimate based on a received power of the second transmission request signal from the third communications device and a received power of the first transmission request signal transmitted from the access router to the second communications device, and decide whether or not to transmit the first transmission request response signal, based on the generated channel quality estimate when the second QoS level is lower than the recovered first QoS level.

In at least some embodiments, the processor 1302 is further configured to make multiple decisions whether or not to transmit a transmission request response signal in different transmission time slots. In some embodiments the processor 1302 is configured to make said multiple decisions, e.g., prior to receiving another pilot signal from the access router.

Figure 14:
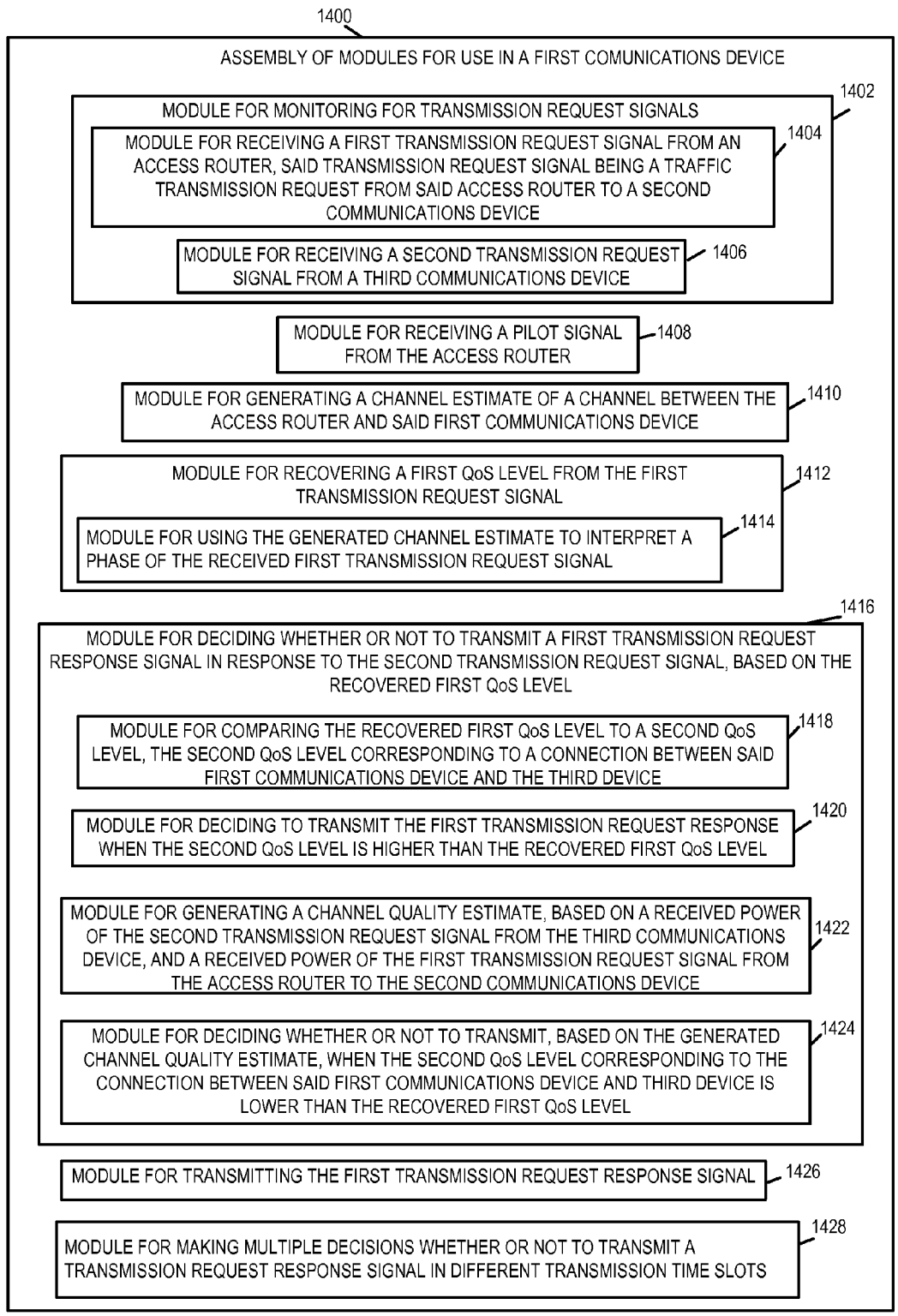
FIG. 14 illustrates an assembly of modules which can be used in the exemplary communications device of FIG. 13.

FIG. 14 is an assembly of modules 1400 which can, and in some embodiments are, used in the communications device 1300 illustrated in FIG. 13. The modules in the assembly 1400 can be implemented in hardware within the processor 1302 of FIG. 13, e.g., as individual circuits. Alternatively, the modules may be implemented in software and stored in the memory 1304 of the communications device 1300 shown in FIG. 13. While shown in the FIG. 13 embodiment as a single processor, e.g., computer, it should be appreciated that the processor 1302 may be implemented as one or more processors, e.g., computers. When implemented in software the modules include code, which when executed by the processor, configure the processor, e.g., computer, 1302 to implement the function corresponding to the module. In embodiments where the assembly of modules 1400 is stored in the memory 1304, the memory 1304 is a computer program product comprising a computer readable medium comprising code, e.g., individual code for each module, for causing at least one computer, e.g., processor 1302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 14 control and/or configure the communications device 1300 or elements therein such as the processor 1302, to perform the functions of the corresponding steps illustrated in the method flowchart 1200 of FIG. 12.

As illustrated in FIG. 14, the assembly of modules 1400 includes a module 1402 for monitoring for transmission request signals. The module 1402 includes a module 1404 for receiving a first transmission request signal from an access router, said first transmission request signal being a traffic transmission request from said access router to a second communications device, and a module 1406 for receiving a second transmission request signal from a third communications device. The assembly of modules 1400 further includes a module 1408 for receiving a pilot signal from the access router, a module 1410 for generating a channel estimate of a channel between the access router and the first communications device 1300, a module 1412 for recovering a first QoS level from the first transmission request signal, a module 1416 for deciding whether or not to transmit a transmission request response signal in response to the second transmission request signal from the third communications device, based on the recovered first QoS level, a module 1426 for transmitting the first transmission request response signal, and a module 1428 making multiple decisions whether or not to transmit a transmission request response in different transmission time slots, for example, prior to receiving another pilot signal from the access router.

In at least some embodiments the module 1412 includes a module 1414 for using the generated channel estimate of the channel between the access router and the first communications device 1300 to interpret a phase of the received first transmission request signal. In at least some embodiments, the module 1416 includes: a module 1418 for comparing the recovered first QoS level to a second QoS level, the second QoS level corresponding to a connection between said first communications device 1300 and the third communications device, a module 1420 for deciding to transmit the first transmission request response when the second QoS level corresponding to the connection between said first communications device 1300 and the third communications device is higher than the recovered first QoS level, a module 1422 for generating a channel quality estimate based on a received power of the second transmission request signal from the third communications device and the received power of the first transmission request signal transmitted from the access router to the second communications device, and a module 1424 for deciding whether or not to transmit the first transmission request response signal, based on the generated channel quality estimate, when the second QoS level is lower than the recovered first QoS level.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, comprising:
    recovering a quality of service level from a transmission request response signal transmitted from an access router to a second communications device, the transmission request response signal being a response to a traffic transmission request from the second communications device requesting permission to transmit;
    making a decision whether or not to transmit traffic data based on the recovered quality of service level;
    receiving a pilot signal from the access router; and
    generating an estimate of a channel between said access router and said first communications device;
    wherein said recovering the quality of service level includes using the generated channel estimate to interpret a phase of the received transmission request response signal.

2. The method of claim 1, wherein said recovering the quality of service level includes recovering the quality of service level from a phase of the transmission request response signal.

3. The method of claim 1, wherein said traffic transmission request is a signal which is transmitted from the second communications device to said access router.

4. The method of claim 1, wherein the quality of service level is a transmission priority level between the second communications device and the access router.

5. A method of operating a first communications device, comprising:
    recovering a quality of service level from a transmission request response signal transmitted from an access router to a second communications device, the transmission request response signal being a response to a traffic transmission request from the second communications device requesting permission to transmit; and
    making a decision whether or not to transmit traffic data based on the recovered quality of service level, wherein said making the decision whether or not to transmit includes comparing the recovered quality of service level to a quality of service level corresponding to said traffic data; and deciding, when the quality of service level of the traffic data to be transmitted is higher than the recovered quality of service level, to transmit irrespective of the received power level of the transmission request response signal.

6. The method of claim 5, wherein said making the decision whether or not to transmit further includes:
deciding, when the quality of service level of the traffic data to be transmitted is lower than the recovered quality of service level, whether or not to transmit based on the received power level of the transmission request response signal and based on an interference cost estimate.

7. A method of operating a first communications device, comprising:
recovering a quality of service level from a transmission request response signal transmitted from an access router to a second communications device, the transmission request response signal being a response to a traffic transmission request from the second communications device requesting permission to transmit; and
making a decision whether or not to transmit traffic data based on the recovered quality of service level;
wherein the transmission request response signal is a single tone signal, the method further comprising:
making multiple decisions whether or not to transmit traffic data in different transmission time slots.

8. A first communications device, comprising:
at least one processor configured to:
recover a quality of service level from a transmission request response signal transmitted from an access router to a second communications device, the transmission request response signal being a response to a traffic transmission request from the second communications device requesting permission to transmit;
make a decision whether or not to transmit traffic data based on the recovered quality of service level;
receive a pilot signal from the access router;
generate an estimate of a channel between said access router and said first communications device; and
use the generated channel estimate to interpret a phase of the received transmission request response signal; and
a memory coupled to the at least one processor.

9. The first communications device of claim 8, wherein said at least one processor is further configured to:
recover said quality of service level from a phase of the transmission request response signal.

10. The first communications device of claim 8, wherein said traffic transmission request is a signal which is transmitted from the second communications device to said access router.

11. The first communications device of claim 8, wherein said at least one processor is further configured to:
compare the recovered quality of service level to a quality of service level corresponding to said traffic data.

12. A first communications device, comprising:
means for recovering a quality of service level from a transmission request response signal transmitted from an access router to a second communications device, the transmission request response signal being a response to a traffic transmission request from the second communications device requesting permission to transmit;
means for making a decision whether or not to transmit traffic data based on the recovered quality of service level;
means for receiving a pilot signal from the access router; and
means for generating an estimate of a channel between said access router and said first communications device;
wherein said means for recovering the quality of service level includes means for using the generated channel estimate to interpret a phase of the received first transmission request response signal.

13. The first communications device of claim 12, wherein said means for recovering the quality of service level includes means for recovering the quality of service level from a phase of the transmission request response signal.

14. The first communications device of claim 12, wherein said traffic transmission request is a signal which is transmitted from the second communications device to said access router.

15. A non-transitory computer program product for use in a first communications device, comprising:
a non-transitory computer readable medium comprising:
code for causing at least one computer to recover a quality of service level from a transmission request response signal transmitted from an access router to a second communications device, the transmission request response signal being a response to a traffic transmission request from the second communications device requesting permission to transmit; and
code for causing the at least one computer to make a decision whether or not to transmit traffic data based on the recovered quality of service level;
code for receiving a pilot signal from the access router; and
code for generating an estimate of a channel between said access router and said first communications device;
wherein said recovering the quality of service level includes using the generated channel estimate to interpret a phase of the received transmission request response signal.

16. The non-transitory computer program product of claim 15, wherein the code for causing the at least one computer to recover the quality of service level includes code for causing the at least one computer to recover the quality of service level from a phase of the transmission request response signal.

17. A method of operating a first communications device, comprising:
recovering a first quality of service level from a first transmission request response signal transmitted from an access router to a second communications device, the first transmission request response signal being a response to a first traffic transmission request signal from the second communications device requesting permission to transmit; and
making a decision, based on the recovered first quality of service level, whether or not to transmit a second transmission request response signal in response to a second traffic transmission request signal requesting permission to transmit.

18. The method of claim 17, wherein said first traffic transmission request signal is transmitted from the second communications device to said access router.

19. The method of claim 18, further comprising:
receiving a pilot signal from the access router;
generating, based on said pilot signal, an estimate of a channel between said access router and said first communications device; and wherein said recovering a first quality of service level includes using the generated channel estimate to interpret a phase of the received first transmission request response signal.

20. The method of claim 19, wherein the first transmission request response signal is a single tone signal, the method further comprising:
making multiple decisions whether or not to transmit a transmission request response signal in different transmission time slots.

21. The method of claim 17,
wherein said second traffic transmission request signal is from a fourth communications device; and
wherein said making a decision whether or not to transmit a second transmission request response signal comprises comparing the recovered first quality of service level to a second quality of service level, said second quality of service level corresponding to a connection between said first communications device and said fourth communications device.

22. The method of claim 21, wherein making a decision whether or not to transmit further includes:
deciding to transmit when the second quality of service level corresponding to the connection between said first communications device and said fourth communications device is higher than the recovered first quality of service level.

23. The method of claim 21, wherein said making a decision whether or not to transmit further includes:
generating a channel quality estimate based on a received power of the second traffic transmission request signal based on a received power of the first traffic transmission request signal; and
deciding, when the second quality of service level corresponding to the connection between said first communications device and the fourth communications device is lower than the recovered first quality of service level, whether or not to transmit based on the generated channel quality estimate.

24. A first communications device, comprising:
at least one processor configured to:
recover a first quality of service level from a first transmission request response signal transmitted from an access router to a second communications device, the first transmission request response signal being a response to a first traffic transmission request signal from the second communications device requesting permission to transmit; and
make a decision, based on the recovered first quality of service level, whether or not to transmit a second transmission request response signal in response to a second traffic transmission request signal requesting permission to transmit; and
a memory coupled to the at least one processor.

25. The first communications device of claim 24, wherein said first traffic transmission request signal is transmitted from the second communications device to said access router.

26. The first communications device of claim 25, wherein said at least one processor is further configured to:
receive a pilot signal from the access router;
generate, based on said pilot signal, an estimate of the channel between said access router and said first communications device; and
use the generated channel estimate to interpret a phase of the received first transmission request response signal.

27. The first communications device of claim 24, wherein said second traffic transmission request is from a fourth communications device; and
wherein the at least one processor is further configured to:
compare, when making a decision whether or not to transmit a second transmission request response signal, the recovered first quality of service level to a second quality of service level, said second quality of service level corresponding to a connection between said first communications device and said fourth communications device.

28. The first communications device of claim 27, wherein the at least one processor is further configured to decide to transmit when the second quality of service level corresponding to the connection between said fourth communications device and said first communication device is higher than the recovered first quality of service level.

29. A first communications device, comprising:
means for recovering a first quality of service level from a first transmission request response signal transmitted from an access router to a second communications device, the first transmission request response signal being a response to a first traffic transmission request signal from the second communications device requesting permission to transmit; and
means for making a decision, based on the recovered first quality of service level, whether or not to transmit a second transmission request response signal in response to a second traffic transmission request signal requesting permission to transmit.

30. The first communications device of claim 29, wherein said first traffic transmission request signal is transmitted from the second communications device to said access router.

31. The first communications device of claim 30, further comprising:
means for receiving a pilot signal from the access router;
means for generating, based on said pilot signal, an estimate of the channel between said access router and said first communications device; and
wherein said means for recovering the first quality of service level comprises means for using the generated channel estimate to interpret a phase of the received first transmission request response signal, said phase of the received first transmission request response signal being used to communicate the first quality of service level.

32. The first communications device of claim 29, wherein said second traffic transmission request is from a fourth communications device; and
wherein said means for making the decision whether or not to transmit a second transmission request response signal comprises means for comparing the recovered first quality of service level to a second quality of service level, said second quality of service level corresponding to a connection between said first communications device and said fourth communications device.

33. A non-transitory computer program product for use in a first communications device, comprising:
a non-transitory computer readable medium comprising:
code for causing at least one computer to recover a first quality of service level from a first transmission request response signal transmitted from an access router to a second communications device, the first transmission request response signal being a response to a first traffic transmission request signal from the second communications device requesting permission to transmit; and
code for causing the at least one computer to make a decision, based on the recovered first quality of service level, whether or not to transmit a second transmission request response signal in response to a second traffic transmission request signal requesting permission to transmit.

34. The non-transitory computer program product of claim 33, wherein said first traffic transmission request signal is transmitted from the second communications device to said access router.

35. The non-transitory computer program product of claim 34, wherein the computer readable medium further comprises:
code for causing the at least one computer to receive a pilot signal from the access router;
code for causing the at least one computer to generate, based on said pilot signal, an estimate of the channel between said access router and said first communications device; and
wherein said code for causing the at least one computer to recover the first quality of service level comprises code for causing the at least one computer to use the generated channel estimate to interpret a phase of the received first transmission request response signal.

36. The non-transitory computer program product of claim 33, wherein said second traffic transmission request is from a fourth communications device; and
wherein said code for causing the at least one computer to make a decision whether or not to transmit a second transmission request response signal comprises code for causing the at least one computer to compare the recovered first quality of service level to a second quality of service level, said second quality of service level corresponding to a connection between said first communications device and said fourth communications device.

* * * * *